(12) United States Patent
Plioska et al.

(10) Patent No.: US 11,649,858 B2
(45) Date of Patent: May 16, 2023

(54) RING, METHOD, AND ASSEMBLY FOR COMPONENT DISPLACEMENT CONTROL

(71) Applicant: SAINT-GOBAIN PERFORMANCE PLASTICS PAMPUS GMBH, Willich (DE)

(72) Inventors: Lukas Plioska, Willich (DE); Brandon Scott Murphy, West Milford, NJ (US); Timothy J. Hagan, Succasunna, NJ (US); Neil James, Chepstow (GB)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 1301 days.

(21) Appl. No.: 15/939,405

(22) Filed: Mar. 29, 2018

(65) Prior Publication Data

US 2018/0283457 A1    Oct. 4, 2018

Related U.S. Application Data

(60) Provisional application No. 62/479,546, filed on Mar. 31, 2017.

(51) Int. Cl.
*F16C 35/02* (2006.01)
*F16C 29/00* (2006.01)
(Continued)

(52) U.S. Cl.
CPC ............. *F16C 35/02* (2013.01); *B60N 2/897* (2018.02); *B60N 2/933* (2018.02); *F16C 27/02* (2013.01);
(Continued)

(58) Field of Classification Search
CPC .... F16D 1/0829; F16D 1/0835; F16D 1/0805; F16D 7/02; F16D 7/021; F16D 7/063;
(Continued)

(56) References Cited

U.S. PATENT DOCUMENTS

| 3,197,243 A | 7/1965 | Brenneke |
| 3,484,143 A | 12/1969 | Tallian et al. |

(Continued)

FOREIGN PATENT DOCUMENTS

| AT | 174257 B | * | 3/1953 |
| CN | 201633580 U | | 11/2010 |

(Continued)

OTHER PUBLICATIONS

International Search Report and Written Opinion for PCT/EP2018/058098, dated Jul. 27, 2018, 16 pages.

(Continued)

*Primary Examiner* — Jonathan P Masinick
(74) *Attorney, Agent, or Firm* — Abel Schillinger, LLP; Robert N Young

(57) ABSTRACT

An assembly having an outer component, an inner component, and a ring positioned between the outer component and the inner component, where the ring has at least one radially extending projection adapted to seat within at least one groove in the inner component or outer component, and where the projection is adapted to compress radially to allow rotational or axial movement between the inner component and the outer component upon application of rotational or axial force respectively to at least one of the inner component or the outer component.

20 Claims, 9 Drawing Sheets

(51) Int. Cl.
*F16C 29/02* (2006.01)
*F16D 7/02* (2006.01)
*F16C 27/02* (2006.01)
*F16C 29/12* (2006.01)
*B60N 2/897* (2018.01)
*B60N 2/90* (2018.01)
*F16D 1/08* (2006.01)

(52) U.S. Cl.
CPC ............ *F16C 29/002* (2013.01); *F16C 29/02* (2013.01); *F16C 29/12* (2013.01); *F16D 7/021* (2013.01); *F16D 1/0835* (2013.01)

(58) Field of Classification Search
CPC ......... Y10T 403/7047; Y10T 403/7049; Y10T 403/7051; Y10T 403/7061
See application file for complete search history.

(56) References Cited

U.S. PATENT DOCUMENTS

| | | | |
|---|---|---|---|
| 3,563,603 A | 2/1971 | D'Aprile | |
| 3,700,271 A | 10/1972 | Blaurock et al. | |
| 3,838,928 A | 10/1974 | Blaurock et al. | |
| 4,277,990 A | 7/1981 | Hall | |
| 4,411,470 A | 10/1983 | Nishimura et al. | |
| 4,568,123 A | 2/1986 | Yasui et al. | |
| 4,711,494 A | 12/1987 | Duvenkamp | |
| 4,790,683 A | 12/1988 | Cramer, Jr. et al. | |
| 4,828,423 A * | 5/1989 | Cramer, Jr. ........... | F16D 1/0835 403/372 |
| 4,854,642 A | 8/1989 | Vidwans et al. | |
| 4,976,493 A | 12/1990 | Frankila | |
| 4,981,390 A | 1/1991 | Cramer, Jr. et al. | |
| 5,156,440 A | 10/1992 | Vidwans | |
| 5,231,901 A | 8/1993 | Putney et al. | |
| 5,445,434 A | 8/1995 | Kohut | |
| 5,738,413 A | 4/1998 | De Filippo | |
| 5,779,177 A | 7/1998 | Kielwein | |
| 5,788,250 A | 8/1998 | Masters et al. | |
| 5,927,813 A | 7/1999 | Nemoto | |
| 5,945,952 A | 8/1999 | Davidson | |
| 5,992,939 A | 11/1999 | Gass et al. | |
| 6,099,077 A | 8/2000 | Isaacson | |
| 6,109,150 A | 8/2000 | Saccomanno, III | |
| 6,288,878 B1 * | 9/2001 | Misso ................... | F16D 1/0835 403/372 |
| 6,296,316 B1 | 10/2001 | Hann | |
| 6,338,403 B1 | 1/2002 | Costin et al. | |
| 6,400,052 B1 | 6/2002 | Suzuki et al. | |
| 6,454,356 B1 | 9/2002 | Yamada | |
| 6,606,224 B2 * | 8/2003 | Macpherson ........ | G11B 5/5526 |
| 6,670,553 B1 | 12/2003 | Gretz | |
| 6,742,846 B1 | 6/2004 | Isaacson | |
| 6,761,409 B2 | 7/2004 | Ford | |
| 6,792,650 B2 | 9/2004 | Stagg et al. | |
| 6,802,565 B2 | 10/2004 | Isaacson | |
| 6,969,118 B2 | 11/2005 | Yamada | |
| 7,390,980 B1 | 6/2008 | Gretz | |
| 7,434,886 B2 | 10/2008 | Yamada | |
| 7,610,671 B2 * | 11/2009 | Watkins ................ | F16C 27/04 29/598 |
| 7,669,933 B2 | 3/2010 | Watanabe | |
| 7,758,115 B2 | 7/2010 | Yamaguchi et al. | |
| 8,282,308 B2 * | 10/2012 | Slayne ................... | F16B 19/02 411/521 |
| 8,313,148 B2 | 11/2012 | Lardies et al. | |
| 8,398,309 B2 | 3/2013 | Ferreira | |
| 8,408,086 B2 * | 4/2013 | Takeuchi ............... | F16D 7/10 74/335 |
| 8,408,800 B2 * | 4/2013 | Hagan .................. | F16C 27/02 384/296 |
| 8,424,184 B2 | 4/2013 | Hughes | |
| 8,485,752 B2 | 7/2013 | Slayne | |
| 8,911,154 B2 * | 12/2014 | Sandey ................. | F16C 35/02 384/535 |
| 8,991,927 B2 | 3/2015 | Wisniewski et al. | |
| 8,998,495 B2 | 4/2015 | Hirose et al. | |
| 9,028,165 B2 * | 5/2015 | Nias ...................... | F16C 27/04 403/372 |
| 9,446,692 B2 | 9/2016 | Hagan et al. | |
| 9,649,959 B2 | 5/2017 | Hagan et al. | |
| 9,707,872 B2 | 7/2017 | Hagan et al. | |
| 9,821,693 B2 | 11/2017 | Hagan et al. | |
| 10,144,328 B2 | 12/2018 | Hagan et al. | |
| 10,174,792 B2 * | 1/2019 | James ................... | B21D 53/18 |
| 10,220,751 B2 | 3/2019 | Hagan et al. | |
| 10,507,751 B2 * | 12/2019 | James ................... | B60N 2/824 |
| 10,711,837 B2 * | 7/2020 | Greinwald ............ | F16C 29/02 |
| 10,926,789 B2 * | 2/2021 | James ................... | F16H 55/283 |
| 2001/0000419 A1 | 4/2001 | Heilig | |
| 2001/0006202 A1 | 7/2001 | Inana et al. | |
| 2002/0134636 A1 | 9/2002 | Ando | |
| 2002/0157235 A1 | 10/2002 | Napolitano, Jr. et al. | |
| 2003/0169951 A1 | 9/2003 | Nishijima et al. | |
| 2003/0205925 A1 | 11/2003 | Ford | |
| 2004/0127294 A1 * | 7/2004 | Ohta ..................... | F16D 7/021 464/41 |
| 2005/0012374 A1 | 1/2005 | Isaacson | |
| 2005/0225903 A1 | 10/2005 | Sprankle et al. | |
| 2006/0061188 A1 | 3/2006 | Locke et al. | |
| 2006/0214492 A1 | 9/2006 | Hassler et al. | |
| 2006/0276246 A1 | 12/2006 | Needes et al. | |
| 2007/0246318 A1 | 10/2007 | Shirataki et al. | |
| 2007/0267908 A1 | 11/2007 | Watanabe | |
| 2008/0043375 A1 | 2/2008 | Hanrahan et al. | |
| 2008/0199254 A1 | 8/2008 | Baker et al. | |
| 2010/0021263 A1 | 1/2010 | Holt et al. | |
| 2010/0046867 A1 | 2/2010 | Hosmer et al. | |
| 2010/0258121 A1 | 10/2010 | Kirniak | |
| 2011/0076096 A1 | 3/2011 | Slayne et al. | |
| 2011/0171020 A1 | 7/2011 | Spathias et al. | |
| 2011/0210594 A1 | 9/2011 | Eisenbraun | |
| 2012/0086255 A1 | 4/2012 | Ishimoto et al. | |
| 2012/0200135 A1 | 8/2012 | Muto et al. | |
| 2012/0240350 A1 * | 9/2012 | Natu ...................... | F16C 17/24 16/2.2 |
| 2014/0062159 A1 | 3/2014 | Kim et al. | |
| 2014/0166423 A1 | 6/2014 | Nias et al. | |
| 2014/0361595 A1 | 12/2014 | Weiland | |
| 2015/0001025 A1 | 1/2015 | Slayne et al. | |
| 2015/0001907 A1 | 1/2015 | Hagan et al. | |
| 2015/0001908 A1 | 1/2015 | Hagan et al. | |
| 2015/0028644 A1 | 1/2015 | Hagan et al. | |
| 2015/0329022 A1 | 11/2015 | Miyaguchi et al. | |
| 2016/0032971 A1 | 2/2016 | Giroud et al. | |
| 2016/0045665 A1 | 2/2016 | Bayer et al. | |
| 2016/0332546 A1 | 11/2016 | Hagan et al. | |
| 2017/0282763 A1 | 10/2017 | Hagan et al. | |
| 2019/0143865 A1 | 5/2019 | Hagan et al. | |

FOREIGN PATENT DOCUMENTS

| | | | |
|---|---|---|---|
| CN | 102076521 A | 5/2011 | |
| CN | 102630281 A | 8/2012 | |
| CN | 102745111 A | 10/2012 | |
| CN | 203142447 U | 8/2013 | |
| CN | 110645329 A * | 1/2020 | |
| DE | 3605774 A1 | 9/1987 | |
| DE | 19524831 A1 | 11/1995 | |
| DE | 19841648 A1 | 4/1999 | |
| DE | 69928345 T2 | 8/2006 | |
| EP | 0798158 A2 | 10/1997 | |
| EP | 0990555 A2 | 4/2000 | |
| EP | 1568554 A1 * | 8/2005 | ....... B60R 25/02107 |
| EP | 1690732 A2 | 8/2006 | |
| EP | 3091243 A1 | 11/2016 | |
| FR | 2877287 A1 | 5/2006 | |
| FR | 2989645 A1 | 10/2013 | |
| JP | S60175152 U | 9/1985 | |
| JP | H05329033 A | 12/1993 | |
| JP | H1189665 A | 4/1994 | |
| JP | H074436 A | 1/1995 | |
| JP | H11198703 A | 7/1999 | |
| JP | 2007307226 A | 11/2007 | |

(56) References Cited

FOREIGN PATENT DOCUMENTS

| | | | |
|---|---|---|---|
| JP | 2010069036 | A | 4/2010 |
| JP | 2010268970 | A | 12/2010 |
| JP | 2013505411 | A | 2/2013 |
| KR | 1998052308 | U | 10/1998 |
| KR | 200186497 | Y1 | 6/2000 |
| KR | 20090124180 | A | 12/2009 |
| KR | 20110006101 | A | 1/2011 |
| KR | 101108273 | B1 | 1/2012 |
| KR | 20130070027 | A | 6/2013 |
| KR | 20130089125 | A | 8/2013 |
| KR | 101485620 | B1 | 1/2015 |
| KR | 20150031295 | A * | 3/2015 |
| WO | 2014210271 | A1 | 12/2014 |
| WO | 2014210302 | A1 | 12/2014 |
| WO | 2015073118 | A2 | 5/2015 |
| WO | 2016060660 | A1 | 4/2016 |
| WO | 2018178245 | A1 | 10/2018 |

OTHER PUBLICATIONS

International Search Report and Written Opinion for PCT/US2014/044273, dated Oct. 23, 2014, 15 pages.
International Search Report and Written Opinion for PCT/US2014/044328, dated Oct. 23, 2014, 15 pages.
International Search Report and Written Opinion for PCT/US2014/060747, dated Jul. 14, 2015, 12 pages.
Supplementary European Search Report for EP14817928, dated Feb. 17, 2017, 6 pages.
Supplementary European Search Report for EP14818694, dated Feb. 17, 2017, 7 pages.
Supplementary European Search Report for EP14903940, dated May 18, 2018, 9 pages.

* cited by examiner

RING, METHOD, AND ASSEMBLY FOR COMPONENT DISPLACEMENT CONTROL

CROSS-REFERENCE TO RELATED APPLICATION(S)

This application claims priority under 35 U.S.C. § 119(e) to U.S. Patent Application No. 62/479,546 entitled "RING, METHOD, AND ASSEMBLY FOR COMPONENT DISPLACEMENT CONTROL", by Lukas PLIOSKA et al., filed Mar. 31, 2017, which is assigned to the current assignee hereof and incorporated herein by reference in its entirety.

FIELD OF THE DISCLOSURE

The invention generally relates to rings that are located between assemblies involving moving parts and, in particular, to an improved method and assembly employing a bearing or tolerance ring.

BACKGROUND

Commonly, a ring may be used to constrain or restrict movement between assemblies involving relatively moving parts, such as inner components including, but not limited to, shafts, and outer components, including, but not limited to, housings. The shaft may rotate within a bore created within the housing. One type of ring is a band located in a gap between the outer surface of the shaft and the inner surface of the bore. This ring may limit radial motion of the shaft within the bore while still permitting rotation or axial movement. Rings may also be used in assemblies requiring movement of a component relative to another include applications such as slide assemblies, slide bearings, clutch assemblies, or holding mechanisms. Such assemblies may be used in automotive applications.

In conventional ring configurations, a close fit between the inner and outer components is sought. In addition, either forces for providing maximal frictional engagement or minimal variation in sliding forces are sought. A close fit between the components is desirable because it reduces relative vibration between the parts. These requirements between the inner and outer components require strong and substantial contact, which increases frictional forces. Further, reduced assembly forces, costs, and assembly time are desired with weight reductions in components within the assemblies.

There is a desire for assemblies that allow for desired linear and/or rotational movement or position control of the components when a desired force is applied, but restriction of linear and/or rotational movement when an undesired force or no force at all is applied. However, control of the desired movement can include to a variety of issues including, large tolerancing, high moving efforts, high part counts, complex assembly procedures, unwanted component vibration, and complex assembly mechanisms. Although these solutions are workable for some applications, improvements in rings and assemblies involving them continue to be of interest.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

The use of the same reference symbols in different drawings indicates similar or identical items.

DETAILED DESCRIPTION OF THE INVENTION

Figure 1:
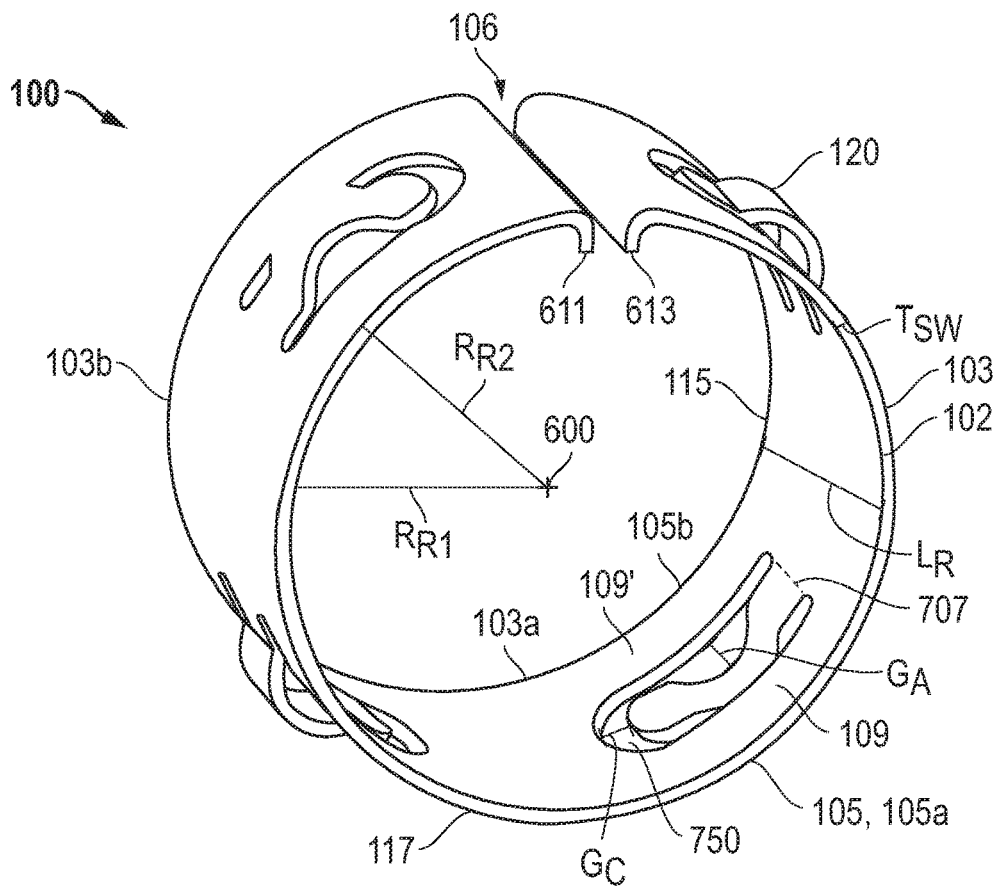
FIG. 1 is a perspective view of one embodiment of a ring constructed in accordance with the invention.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the ring assembly and component arts.

FIGS. 1-4 depict a ring 100 according to a number of embodiments. The ring 100 may be a tolerance ring or a bearing ring. The ring 100 comprises a band 102 of resilient material that may be curved into a ring-like (substantially annular) shape about a central axis 600. The ring 100 may have a first axial end 115 and a second axial end 117. The band 102 may include a sidewall 103. In an embodiment, the band 102 may include an interior sidewall 103a and an exterior sidewall 103b. The sidewall 103 may have an axial edge 105. In a number of embodiments, the sidewall 103 may have a first axial edge 105a and a second axial edge 105b. In a number of embodiments, the ring 100 or band 102 may have a flat, circumferentially-extending rim 109, 109' of resilient material along at least one axial end 115, 117 of the sidewall 103. In a number of embodiments, a rim 109a, 109b of material at each axial end 105, 107 of the sidewall 103 of the ring 100. In an embodiment, a first circumferential end 611 and a second circumferential end 613 of the band 102 do not meet (e.g., it may be formed as a split ring design), thereby leaving an axial gap 106 adjacent the circumference of the band 102. In other embodiments, the band may be curved so that the ends overlap with one another. In yet further embodiments, the band may be a continuous, unbroken ring. In an embodiment, the interior sidewall 103a may include an inner surface. In an embodiment, the exterior sidewall 103b may include an outer surface.

Figure 2:
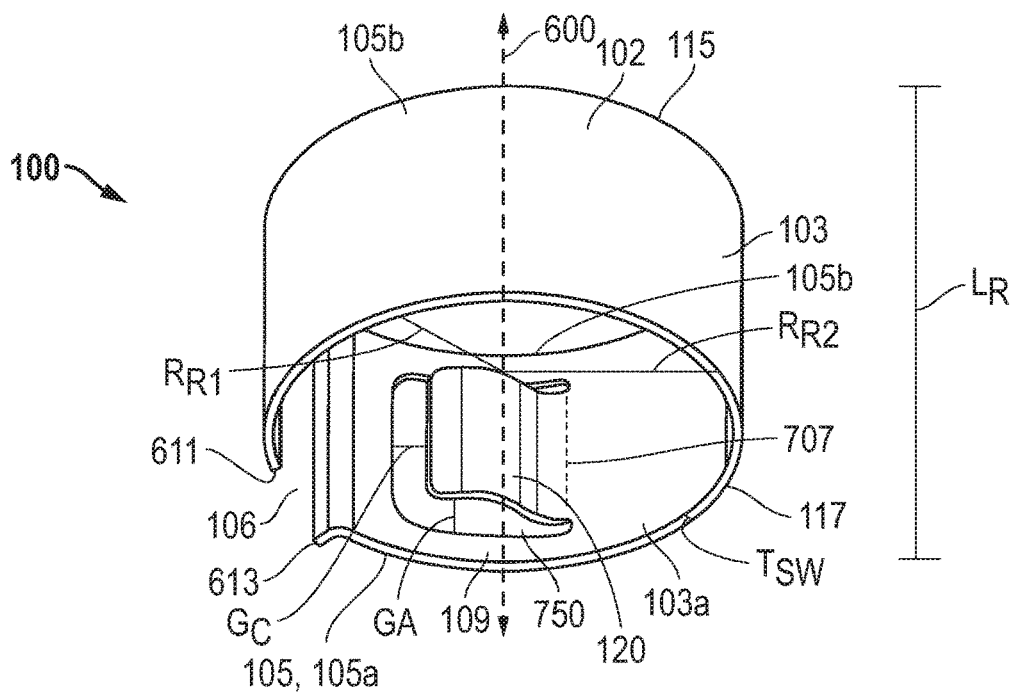
FIG. 2 is a perspective view of one embodiment of a ring constructed in accordance with the invention.
Figure 3:
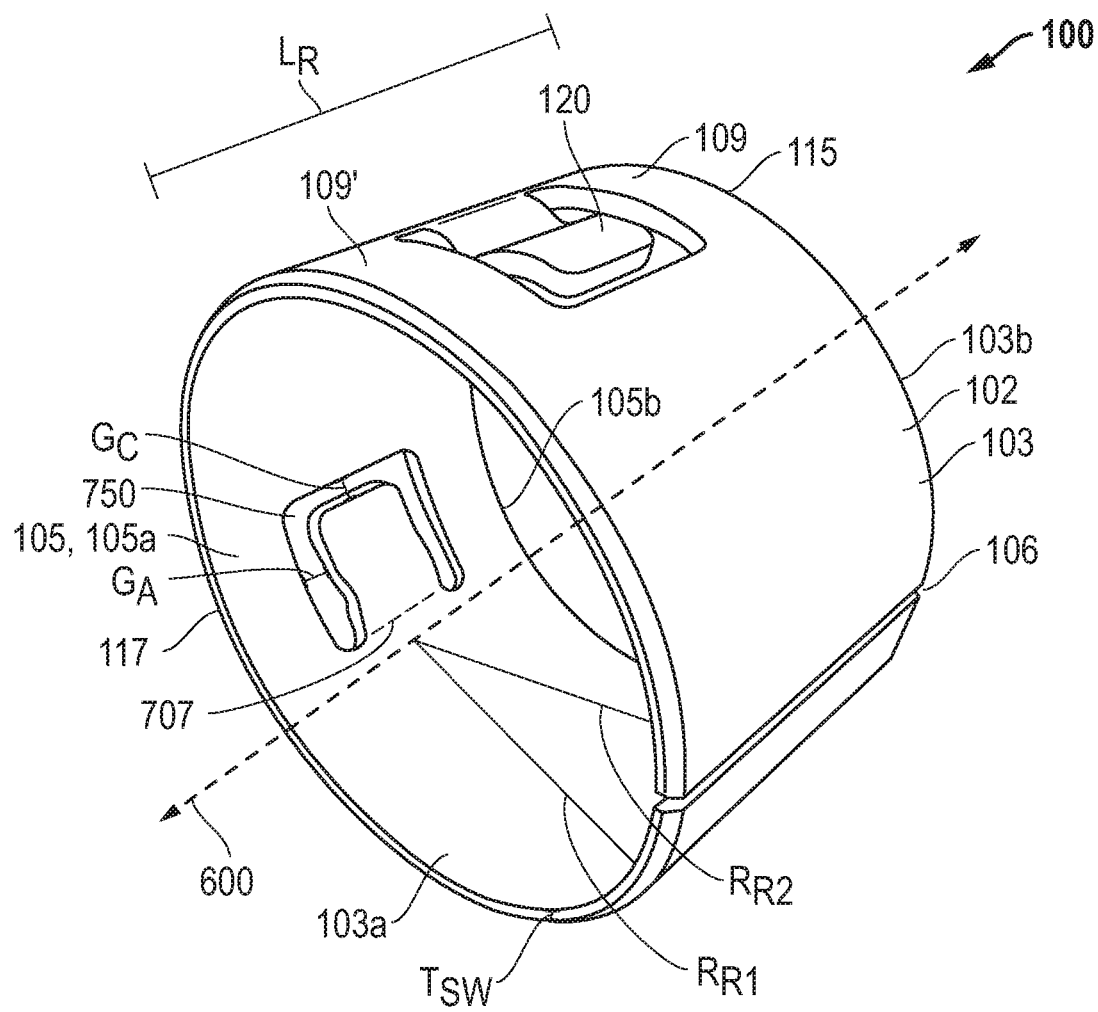
FIG. 3 is a perspective view of one embodiment of a ring constructed in accordance with the invention.
Figure 4:
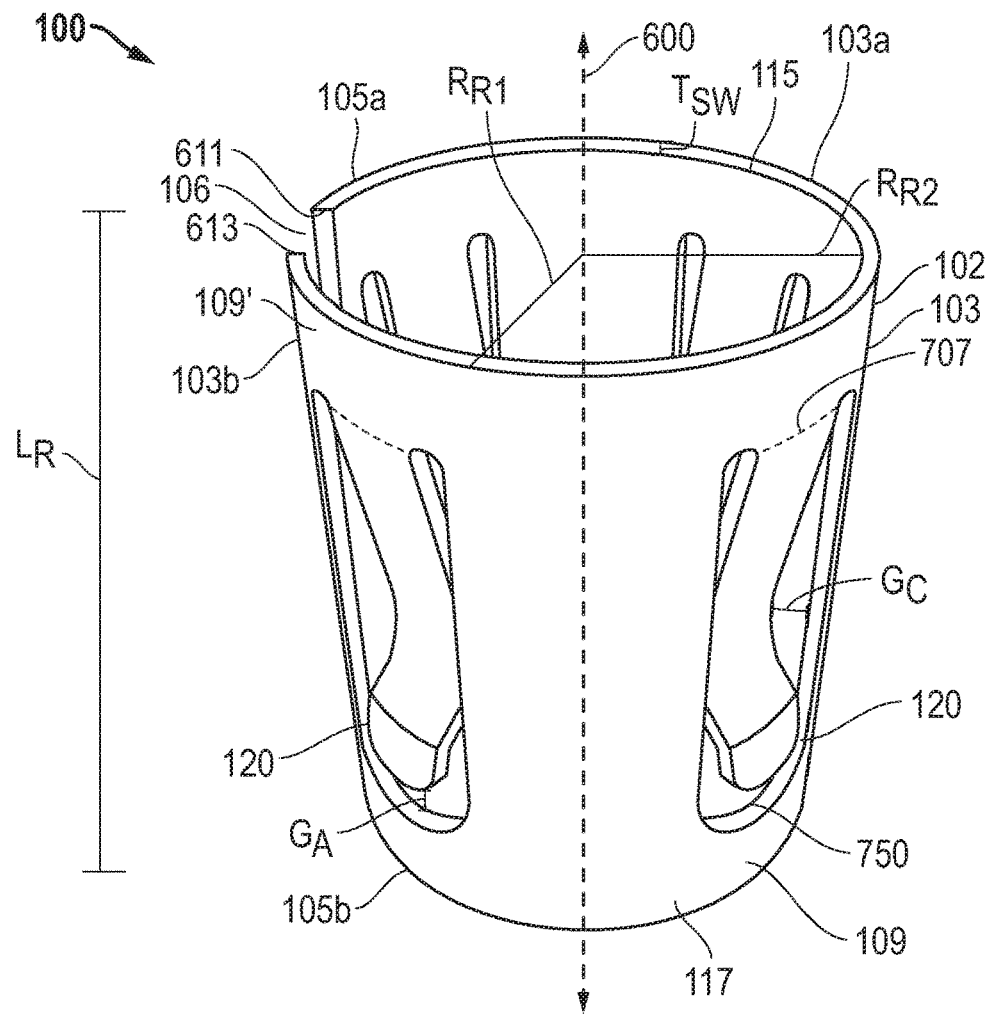
FIG. 4 is a perspective view of one embodiment of a ring constructed in accordance with the invention.

Referring to FIGS. 1-4 and FIGS. 9-10, in a number of embodiments, at least one projection 120 may be at least partially coupled to the ring 100. In an embodiment, the projection 120 may be formed in the ring 100. The projection 120 can be monolithic with the sidewall 103, i.e., the projection 120 may have a unitary construction with the sidewall 103. In another particular embodiment, at least one of the projections 120 may comprise a separate component attached to the sidewall 103. For example, the separate component may be attached to the sidewall 103 by an adhesive, welding, crimping, or any other suitable process recognizable in the art. In an embodiment, the projection 120 may be located axially inward of an axial edge 115, 117 of the sidewall 103 of the ring 103. In an embodiment, at least one projection 120 can extend radially outward from the sidewall 103. In an embodiment, at least one projection 120 can extend radially inward from the sidewall 103. In an embodiment, as shown in FIGS. 1-3, at least one projection 120 can be oriented circumferentially down the sidewall 103 of the ring. In an alternative embodiment, as shown in FIG. 4, at least one projection 120 can be oriented axially down the sidewall 103 of the ring. The projection 120 may be radially extending. In an embodiment, the projections 120 may be radially extending away from the central axis 600. In an embodiment, the projections 120 may be self-contained, discrete structures and may retain any grease applied before assembly and reduce or minimize subsequent leakage.

In a number of embodiments, the ring 100 can comprise a material with sufficient rigidity to withstand axial and longitudinal forces. In another embodiment, the ring 100 can comprise a metal or alloy (such as, but not limited to, aluminum, zinc, copper, magnesium, tin, platinum, titanium, tungsten, lead, iron, bronze, steel, spring steel, stainless steel) formed through a machining process. The ring 100 can be formed from a single piece, two pieces, or several pieces joined together by welding, adhesive, fasteners, threading, or any other suitable fastening means.

Figure 5:
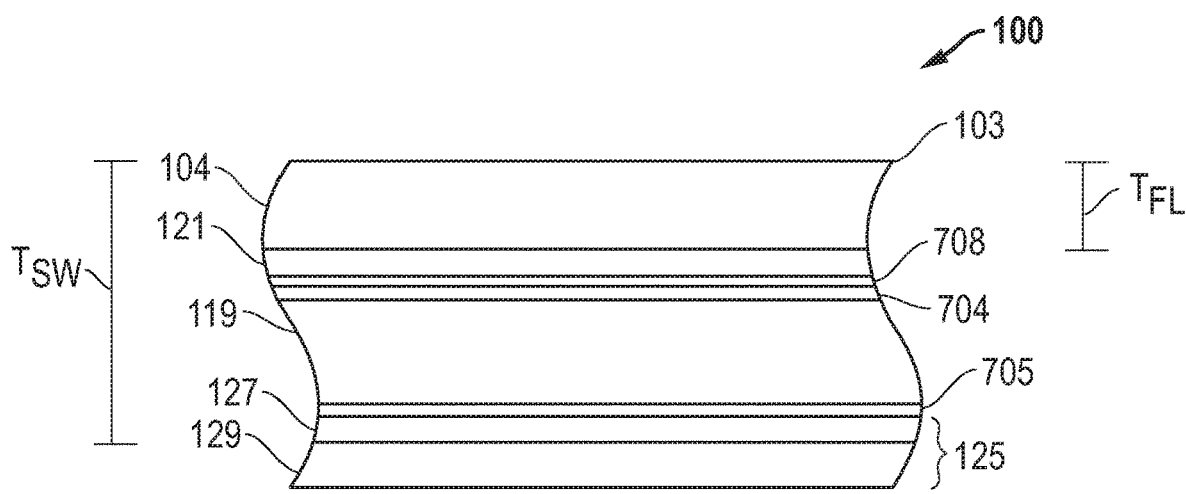
FIG. 5 is a schematic sectional side view of another embodiment of a ring having layers and is constructed in accordance with the invention.
Figure 6A:
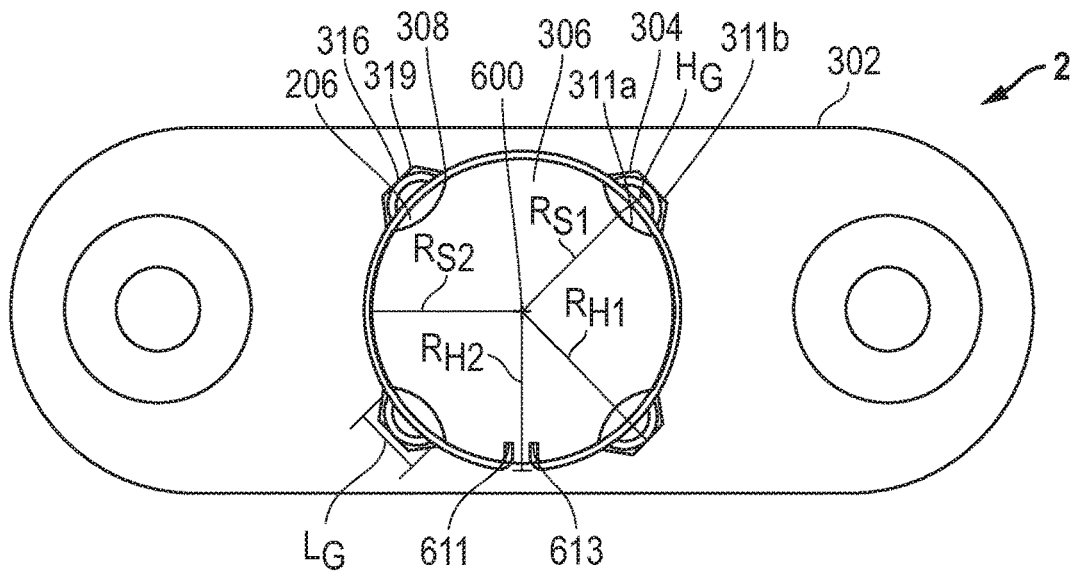
FIG. 6A is an end view of an assembly constructed in accordance with the invention.
Figure 6B:
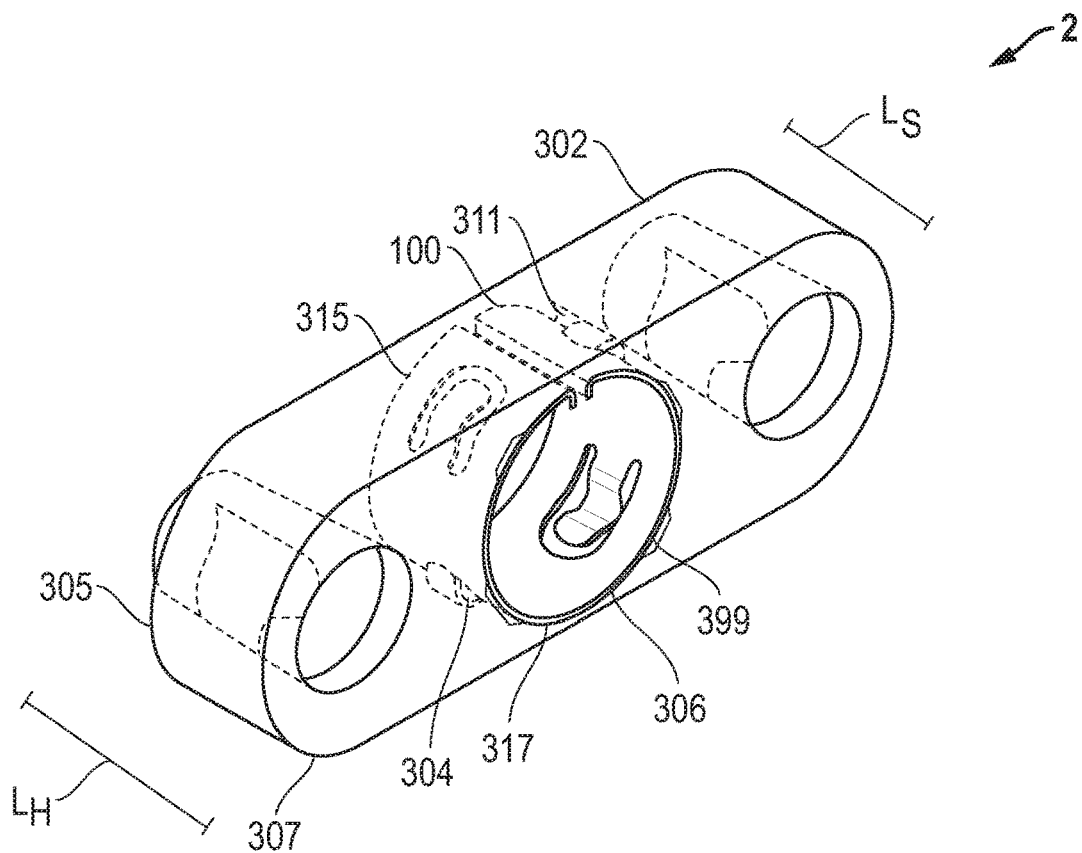
FIG. 6B is a perspective view of an assembly constructed in accordance with the invention.

In an embodiment, as shown in FIG. 5, the ring 100 can include a composite material. The ring 100 may include a substrate 119 and a low friction/wear resistant layer 104. In an embodiment, the inner surface of the interior sidewall 103a may have a low friction/wear resistant layer 104a that conforms to the shape of the band 102. In an embodiment, the outer surface of the exterior sidewall 103b may have a low friction/wear resistant layer 104b that conforms to the shape of the band 102. The low friction/wear resistant layer 104 can be coupled to at least a portion of the substrate 119, most notably the portion of the substrate along a projection 120. In a further embodiment, the low friction/wear resistant layer 104 can be coupled to an entire major surface of the sidewall 103 e.g., the radially inner 103a or radially outer surface 103b of the sidewall 103. In a particular embodiment, the low friction/wear resistant layer 104 can be coupled to the radially inner surface of the substrate 119 so as to form a low friction interface with another surface of another component.

In an embodiment, the substrate 119 can at least partially include a metal. The metal may include aluminum, zinc, copper, magnesium, tin, platinum, titanium, tungsten, lead, iron, bronze, alloys thereof, or may be another type. More particularly, the substrate can at least partially include a steel, such as a stainless steel. For example, the substrate can at least partially include a 301 stainless steel. The 301 stainless steel may be annealed, ¼ hard, ½ hard, ¾% hard, or full hard. The substrate 119 may include a woven mesh or an expanded metal grid. Alternatively, the woven mesh can be a woven polymer mesh. In an alternate embodiment, the substrate 119 may not include a mesh or grid. Optionally, the ring 100 may include at least one adhesive layer 121 that may include any known adhesive material common to the ring arts including, but not limited to, fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. In another alternate embodiment, the substrate 119, as a solid component, woven mesh or expanded metal grid, may be embedded between at least one adhesive layer 121 included between the friction material 104 and the substrate 119.

Optionally, the substrate 119 may be coated with corrosion protection layers 704 and 705 to prevent corrosion of the load bearing substrate prior to processing. Additionally, a corrosion protection layer 708 can be applied over layer 704. Each of layers 704, 705, and 708 can have a thickness of about 1 to 50 microns, such as about 7 to 15 microns. Layers 704 and 705 can include a phosphate of zinc, iron, manganese, or any combination thereof, or a nano-ceramic layer. Further, layers 704 and 705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Corrosion protection layers 704, 706, and 708 can be removed or retained during processing.

Optionally, the ring 100 may further include a corrosion resistant coating 125. The corrosion resistant coating 125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 127 can include a phosphate of zinc, iron, manganese, tin, or any combination thereof, or a nano-ceramic layer. The adhesion promoter layer 127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, the low friction/wear resistant layer 104 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction/wear resistant layer 104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. The low friction/wear resistant layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments.

The low friction/wear resistant layer 104 may further include fillers, including glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and barium sulfate, or any combination thereof. Fillers can be in the form of beads, fibers, powder, mesh, or any combination thereof.

In some embodiments, the ring 100 may be formed from a flat strip of resilient material (which forms the band 102). Before the strip is bent into its curved shape, the low friction/wear resistant layer 104 may be laminated onto one surface thereof. In other embodiments, the low friction/wear resistant layer 104 may be laminated onto both surfaces of the flat strip 102. After the low friction/wear resistant layer 104 may be attached to the flat strip, the resulting layer structure may be stamped (e.g., pressed using a suitably shaped mold, rotary wave forming, etc.) to form projections 120. Thus, at least one of the projections 120 may be formed from both the strip of resilient material and from the low friction/wear resistant layer 104. The material of the low friction/wear resistant layer 104 may be chosen to be flexible to facilitate this stamping step. The friction layer 104 may be on the radial outside or the radial inside of the band at the interior sidewall 103a or the exterior sidewall 103b. After the projections 120 may be formed, the layered structure may be curved into the ring-like configuration shown in FIG. 5. In the embodiment shown, the band 102 may be the outer material. In other embodiments, the band 102 may be the inner material.

In an embodiment, the sidewall 103 can have a thickness $T_{SW}$ in a range of 0.2 mm and 25 mm. In a more particular embodiment, the sidewall 103 can have a thickness $T_{SW}$ in a range of 0.2 mm and 1 mm, such as in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness $T_{SW}$ can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a more particular embodiment, the sidewall 103 can have a thickness $T_{SW}$ between 0.35 mm and 0.65 mm.

In an embodiment, the low friction/wear resistant layer can have a thickness $T_{FL}$ in a range of 0.1 mm and 0.4 mm, such as in a range of 0.15 mm and 0.35 mm, or even in a range of 0.2 mm and 0.3 mm. In this embodiment, the substrate 119 can form all, or nearly all, of the remaining thickness of the sidewall 103. In an embodiment, the thickness of the sidewall 103 may be uniform, i.e., a thickness at a first location of the sidewall 103 can be equal to a thickness at a second location therealong.

In some embodiments, the ring 100 may be formed from spring steel (e.g., cold rolled stainless steel) and may have a low friction/wear resistant layer 104 laminated thereto. For example, the stainless steel may be 0.1 to 0.7 mm thick, and the low friction may be in a range of about 0.05 to 0.50 mm thick (e.g., 0.25 mm) and bonded to the steel before the ring 100 may be formed into its circular shape.

In an embodiment, referring to FIGS. 1-4, the ring 100 may have an inner radius $R_{R1}$ of at least 5 mm, at least 10 mm, at least 15 mm, at least 20 mm, at least 30 mm, at least 40 mm. The inner radius $R_{R1}$ may be no greater than 5 mm, no greater than 10 mm, no greater than 15 mm, no greater than 20 mm, no greater than 30 mm, no greater than 40 mm. The ring 100 may have an outer radius $R_{R2}$ of at least 5 mm, at least 10 mm, at least 15 mm, at least 20 mm, at least 30 mm, at least 40 mm. The outer radius $R_{R2}$ may be no greater than 5 mm, no greater than 10 mm, no greater than 15 mm, no greater than 20 mm, no greater than 30 mm, no greater than 40 mm. In an embodiment, the ring 100 can have an axial length, $L_R$, as measured between axial ends 115, 117, of no greater than 5 mm, no greater than 10 mm, no greater than 15 mm, no greater than 20 mm, no greater than 30 mm, no greater than 40 mm. The ring 100 can have an axial length, $L_R$, as measured between axial ends 115, 117, of at least 5 mm, at least 10 mm, at least 15 mm, at least 20 mm, at least 30 mm, at least 40 mm. The inner radius $R_{R1}$ may vary along the axial length $L_R$. The outer radius $R_{R2}$ may vary along the axial length $L_R$.

FIGS. 6A-8D depict an assembly 2 which incorporates, for example, the ring 100 shown in FIGS. 1-4 according to a number of embodiments. The assembly 2 further includes an outer component 302. The outer component 302 may have a first axial end 305 and a second axial end 307. The outer component 302 may have a bore 304 formed therein, which receives an inner component 306. The bore 304 may be provided in at least one of the radial or axial direction relative to the central axis 600. Rings 100 may be used to transfer torque between the outer component 302 and the inner component 306. The inner component 306 may have a first axial end 315 and a second axial end 317. Rings 100 may be used to provide a frictional fit between the outer component 302 and the inner component 306. In a number of embodiments, the ring 100 may be fixed to at least one of the inner component 306 or the outer component 302 through form fitting, force fitting, or bonding (including, but not limited to, adhesive bonding). In an embodiment, the projection 120 may comprise a circumferentially extending rounded disconnected ridge with tapered shoulders at its axial ends. When the ring 100 is mounted on the inner or outer component 302, 306 in an assembly 2, the tapered shoulders may act as guides to aid axial installation of the other component 302, 306. The assembly 2 also may include a drive unit (not shown) arranged to cause relative rotation or axial movement between the inner component 306 and the outer component 302, wherein the ring 100 may be arranged to permit circumferential slipping between the outer surface of the inner component 306 and the inner surface of the outer component 302.

An annular gap 206 may exist between an outer surface 308 of inner component 306 and an inner surface 310 of bore 304. The size of this annular gap 206 may be variable because the diameter of the inner component 306 and bore 304 may vary within manufacturing tolerances. To prevent vibration of the inner component 306 within the bore 304, the annular gap 206 may be filled by ring 100 to form a zero-clearance fit between the components. The ring 100 may reduce the gap to zero so there may be no clearance between the components in assembly 2.

In a number of embodiments, the ring 100 may be retained on the inner component 306. The outer diameter of the inner component 306 may be greater than an inner diameter of the ring 100 at rest. Thus, the ring may expand (axial gap 106 may widen) to fit the ring 100 around the surface 308 of the inner component 306. The ring 100 may expand or compress in this way to allow for different inner component 306 or outer component 302 sizes. In this configuration, the coefficient of friction at a slip interface (between inner component 306 and low friction/wear resistant layer 104) may be very small compared to the coefficient of friction at the contact area between the band 102 and outer component 302. Thus, slipping may be substantially limited to and occurs substantially freely at the slip interface. In other embodiments, the arrangement of the inner component 306 and low friction/wear resistant layer 104 may be such that the slip interface may be between the outer component 302 and the ring 200.

In an embodiment, the outer component 302 can include any material commonly used in the rotational, sliding, or clutch assembly arts. The outer component 302 can comprise any suitable material with sufficient rigidity to withstand axial and longitudinal forces. In a particular embodiment, the outer component 302 can comprise an injection molded polymer. In another embodiment, the outer component 302 can comprise a metal or alloy (such as, but not limited to, aluminum, zinc, copper, magnesium, tin, platinum, titanium, tungsten, lead, iron, bronze, steel, spring steel, stainless steel) formed through a machining process. In yet another embodiment, the outer component 302 can comprise a ceramic or any other suitable material. The outer component 302 can be formed from a single piece, two pieces, or several pieces joined together by welding, adhesive, fasteners, threading, or any other suitable fastening means.

In an embodiment, referring to FIGS. 6A-8D, the outer component 302 may have an inner radius $R_{H1}$ from a central axis 600 of at least 5 mm, at least 10 mm, at least 15 mm, at least 20 mm, at least 30 mm, at least 40 mm. The inner radius $R_{H1}$ may be no greater than 5 mm, no greater than 10 mm, no greater than 15 mm, no greater than 20 mm, no greater than 30 mm, no greater than 40 mm. In an embodiment, the outer component 302 may have an outer radius $R_{H2}$ from a central axis 600 of at least 5 mm, at least 10 mm, at least 15 mm, at least 20 mm, at least 30 mm, at least 40 mm. The outer radius $R_{H2}$ may be no greater than 5 mm, no greater than 10 mm, no greater than 15 mm, no greater than 20 mm, no greater than 30 mm, no greater than 40 mm. In an embodiment, the outer component 302 can have an axial length, $L_H$, as measured between axial ends 305, 307, of no greater than 5 mm, no greater than 10 mm, no greater than 15 mm, no greater than 20 mm, no greater than 30 mm, no greater than 40 mm. The outer component 302 can have an axial length, $L_H$, as measured between axial ends 305, 307, of at least 5 mm, at least 10 mm, at least 15 mm, at least 20 mm, at least 30 mm, at least 40 mm. The inner radius $R_{H1}$ may vary along the axial length $L_H$. The outer radius $R_{H2}$ may vary along the axial length $L_H$.

In an embodiment, the inner component 306 can include any material commonly used in the rotational, sliding, or clutch assembly arts. The inner component 306 can comprise any suitable material with sufficient rigidity to withstand axial and longitudinal forces. In a particular embodiment, the inner component 306 can comprise an injection molded polymer. In another embodiment, the inner component 306 can comprise a metal or alloy (such as, but not limited to, aluminum, zinc, copper, magnesium, tin, platinum, titanium, tungsten, lead, iron, bronze, steel, spring steel, stainless steel) formed through a machining process. In yet another embodiment, the inner component 306 can comprise a ceramic or any other suitable material. The inner component 306 can be formed from a single piece, two pieces, or several pieces joined together by welding, adhesive, fasteners, threading, or any other suitable fastening means.

In an embodiment, referring to FIGS. 6A-8D, the inner component 306 may have an inner radius $R_{S1}$ from a central axis 600 of at least 5 mm, at least 10 mm, at least 15 mm, at least 20 mm, at least 30 mm, at least 40 mm. The inner radius $R_{S1}$ may be no greater than 5 mm, no greater than 10 mm, no greater than 15 mm, no greater than 20 mm, no greater than 30 mm, no greater than 40 mm. The inner component 306 may have an outer radius $R_{S2}$ from a central axis 600 of at least 5 mm, at least 10 mm, at least 15 mm, at least 20 mm, at least 30 mm, at least 40 mm. The outer radius $R_{S2}$ may be no greater than 5 mm, no greater than 10 mm, no greater than 15 mm, no greater than 20 mm, no greater than 30 mm, no greater than 40 mm. In an embodiment, the inner component 306 can have an axial length, $L_S$, as measured between axial ends 315, 317, of no greater than 5 mm, no greater than 10 mm, no greater than 15 mm, no greater than 20 mm, no greater than 30 mm, no greater than 40 mm. The inner component 306 can have an axial length, $L_S$, as measured between axial ends 315, 317, of at least 5 mm, at least 10 mm, at least 15 mm, at least 20 mm, at least 30 mm, at least 40 mm. The inner radius $R_{S1}$ may vary along the axial length $L_S$. The outer radius $R_{S2}$ may vary along the axial length $L_S$.

Referring back to FIGS. 1-4 and FIGS. 9-10, as stated above, in a number of embodiments, at least one projection 120 may be at least partially coupled to the ring 100. In an embodiment, an average thickness of at least one of the projection 120 can be approximately equal to the thickness of the sidewall 103. For example, the average thickness of the at least one projection 120 may be within 10% of the thickness of the sidewall 103. In another embodiment, the average thickness of at least one of the projection 120 may be different than the thickness of the sidewall 103, i.e., the average thickness of the projection 120 may be greater than 10% different than the thickness of the sidewall 103. In a number of embodiments, at least one projection 120 may have a Young's modulus of between about 185 GPa to about 195 GPa. The projection 120 may include the substrate 119, low friction/wear resistant layer 104 or any of the layers disclosed above.

Figure 9:
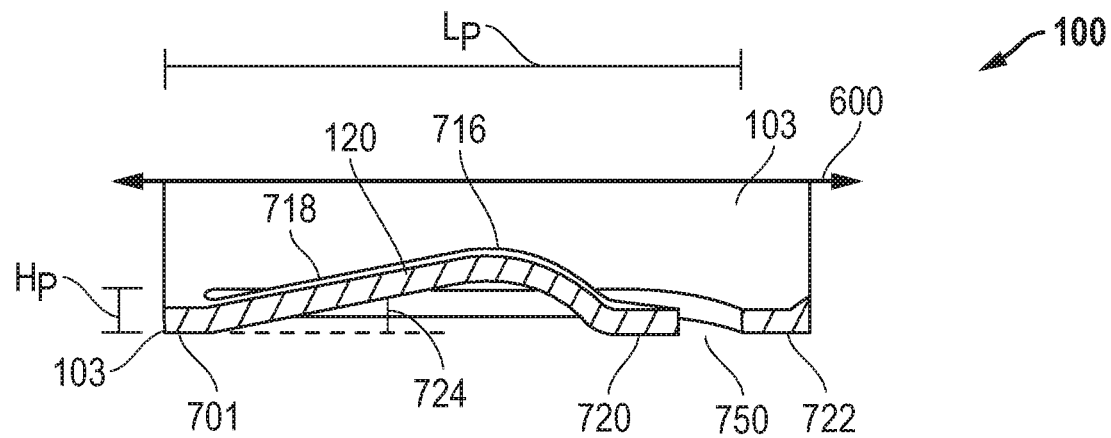
FIG. 9 is a close-up cross-sectional view of one embodiment of a ring constructed in accordance with the invention.
Figure 10:
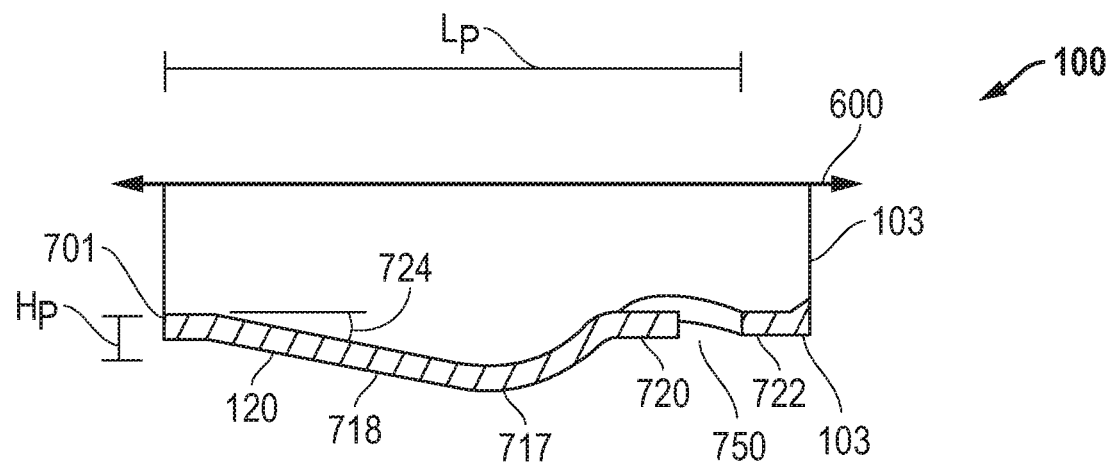
FIG. 10 is a close-up cross-sectional view of one embodiment of a ring constructed in accordance with the invention.

In a number of embodiments, as shown in FIGS. 9-10, the projections 120 may have a circumferential length $L_P$ as measured as the circumferential distance between the circumferential edges of the projection 120. The projections 120 may have a circumferential length $L_P$ of at least 0.5 mm, at least 0.10 mm, at least 0.15 mm, at least 0.20 mm, at least 0.30 mm, at least 0.40 mm. The projections 120 may have a circumferential length $L_P$ that may be no greater than 0.5 mm, no greater than 0.10 mm, no greater than 0.15 mm, no greater than 0.20 mm, no greater than 0.30 mm, no greater than 0.40 mm.

In a number of embodiments, as shown in FIGS. 9-10, the projections 120 may have a radial height $H_P$ as measured from the radially innermost surface 716 or radially outermost surface 717 to the sidewall 103. The projections 120 may have a radial height $H_P$ of at least 0.5 mm, at least 0.10 mm, at least 0.15 mm, at least 0.20 mm, at least 0.30 mm, at least 0.40 mm. The projections 120 may have a radial height $H_P$ that may be no greater than 0.5 mm, no greater than 0.10 mm, no greater than 0.15 mm, no greater than 0.20 mm, no greater than 0.30 mm, no greater than 0.40 mm.

Each projection 120 can define an aspect ratio as measured by a length thereof as compared to a width thereof. The projection 120 length may be defined as the larger dimension between length and width of the projection 120 in the axial or circumferential direction. The projection width may be defined as the smaller dimension of length and width of the projection 120 in the axial or circumferential direction. In an embodiment, at least one of the projections 120 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

Referring FIGS. 1-4 and 9-10, in an embodiment, at least one of the projection 120 can be coupled to the sidewall 103 along a first side 701 thereof (indicated at dashed line 707). In an embodiment, the at least one projections 120 can be continuously disconnected from the sidewall 103 along the remaining sides. For example, the at least one projection 120 can be continuously disconnected from an entire third side (opposite the first side 706) and at least a portion of opposite second and fourth sides (each extending between the first and third sides). This may form a bore 750 in the sidewall 103. As used herein, "continuously disconnected" refers to a single disconnection or gap between the projection 120 and the sidewall 103. In such a manner, the projection 120 can be attached to the sidewall 103 along only one side.

The projection 120 may be formed by a process, such as, for example, stamping, pressing, punching, or cutting. In an embodiment, at least one of the projections 120 may be formed prior to formation of the sidewall 103, e.g., prior to rolling a flat sheet to form the sidewall 103. In an embodiment, at least one of the projections 120 may be formed after formation of the sidewall 103, e.g., after rolling a flat sheet to form the sidewall 103.

In an embodiment, at least two of the projections 120 have the same geometric shape or size as compared to each other. In a further embodiment, all of the projections 120 may have the same geometric shape or size as compared to each other. In another embodiment, at least two of the projections 120 may have different geometric shapes or sizes as compared to each other. In a further embodiment, all of the projections 120 may have different geometric shapes or sizes as compared to each other.

The projections 120 may be carefully selected and designed for their force transfer or spring properties. The geometry of the projections 120 may be selected to provide desired elastic/plastic deformation characteristics. For example, at least one of the projections 120 may be altered in geometry from another projection 120 to alter the rotational or axial movement of the projections 120. The deformation characteristics may be selected not only to take account of the manufacturing tolerances of the inner and outer components 302, 306, but also to compensate for differential thermal expansion and wear that may occur between dissimilar components in operation, thus ensuring the desired performance may be achieved throughout. These designs may be applicable to zero clearance rings 100 to ensure that the assembled components 302, 306 do not become loose at elevated temperatures.

In use, the band 102 of the ring 100 may deform elastically when mounted on one of the components 302, 306 in the assembly 2. The other of the components 302, 306 may be mounted on the assembly 2, thereby compressing the ring in the gap 206 between the components 302, 306, preferably only the projections 120 deform. This deformation may be elastic or plastic, depending on the shape and/or profile of the projections 120 and the size of the gap 206. If only the projections 120 deform in this way, the force transmitting contact area at a slip interface may not be substantially altered when the ring 100 is compressed. This enables a consistent slip force to be achieved.

The low friction/wear resistant layer 104 may include a series of discrete patches attached to or laminated on the band 102. For example, the low friction/wear resistant layer 104 may be provided at contact points at the slip interface. In one embodiment, patches of low friction/wear resistant layer 104 may be attached to the band 102 at the footprint regions and the rims 109. The band 102 may be exposed where there is no contact at the slip interface. In another embodiment, the low friction/wear resistant layer 104 may have substantially the same circumferential extent as the band 102. The low friction/wear resistant layer 104 may be provided at all contact points between the ring 100 and inner/outer component 302, 306 at the slip interface. The band 102 therefore does not contact the component that may be moving relative to it at the slip interface, which can reduce friction.

The low friction/wear resistant layer 104 may be attached to a surface of the band 102 facing the inner or outer component 302, 306. The low friction/wear resistant layer 104 may be coated or bonded to the band 102. In one embodiment, the low friction/wear resistant layer 104 may be laminated on the surface of the band 102. Laminating the low friction/wear resistant layer 104 provides an even thickness around the band 102 to avoid thin patches that may occur if the layer is coated by immersing the band 102 in a liquid form of the second material and spinning or otherwise shaking off the excess.

In some embodiments, the ring 100 may be secured on one of the inner or outer components 302, 306, whereby the slip interface may be between the ring 100 and the other of the components. For example, the ring 100 may be secured or retained by resilient gripping of the band 102 on the inner component 306. In this example, the low friction/wear resistant layer 104 may be provided only on the inner surface of the band 102 and the projections 120 may extend radially outwardly from the band 102, e.g., toward the outer component 302. With this arrangement, the slip interface may be at the contact area between the inner surface of the ring 100 and the inner component 306, where the footprints of the projections 120 and the rims 109, 109' of the ring 100 contact the inner component 306.

Referring again to FIGS. 1-4, in a more particular embodiment, the ring 100 can include a plurality of projections 120 at least partially coupled to the sidewall 103. In an embodiment, the plurality of projections 120 can be spaced apart in a circumferential direction around the sidewall 103. In a more particular embodiment, each of the plurality of projections 120 may be spaced apart from one another an equal distance as measured around a circumference of the sidewall 103.

In an embodiment, the plurality of projections 120 can be disposed in at least two circumferentially extending rows. In a particular embodiment, the plurality of projections 120 may be disposed in at least 3 circumferentially extending rows, such as at least 4 circumferentially extending rows, at least 5 circumferentially extending rows, or even at least 6 circumferentially extending rows. In another embodiment, the plurality of projections 120 can be disposed in no greater than 25 circumferentially extending rows, such as no greater than 15 circumferentially extending rows, no greater than 10 circumferentially extending rows, or even no greater than 7 circumferentially extending rows.

In an embodiment, at least two projections 120 can extend from the sidewall 103 in different directions. In a more particular embodiment, at least two projections 120 can extend in opposite radial directions from the interior sidewall 103a and the exterior sidewall 103b. In a more particular embodiment, at least two projections 120 can extend in opposite axial directions. In an embodiment, at least two projections 120 may extend away from each other, i.e., the connected sides 707 of at least two projections 120 may be closer together than any other portion of the projections 120.

In an embodiment, the projections 120 can each define an axial bisecting line. In an embodiment, the axial bisecting lines of at least two projections 120 can be oriented parallel, i.e., the at least two projections 120 may be oriented parallel to each other. In a more particular embodiment, all of the projections 120 can be oriented parallel with respect to each other.

The projections 120 can each define a maximum circumferential gap distance, GC, as measured with respect to the sidewall 103 in a circumferential direction (perpendicular to axis 600), and a maximum axial gap distance, GA, as measured with respect to the sidewall 103 in an axial direction (along axis 600). In an embodiment, GA can be different than GC.

In a particular embodiment, as shown in FIGS. 1-3, the maximum axial gap distance, GA, can be greater than the maximum circumferential gap distance, GC. For example, GA can be at least 105% GC, such as at least 110% GC, at least 120% GC, at least 120% GC, or even at least 145% GC. In another embodiment, GA can be no greater than 500% GC, such as no greater than 400% GC, no greater than 300% GC, or even no greater than 200% GC.

In a particular embodiment, as shown in FIG. 4, the maximum circumferential gap distance, GC, can be greater than the maximum axial gap distance, GA. For example, GC can be at least 105% GA, such as at least 110% GA, at least 120% GA, at least 120% GA, or even at least 145% GA. In another embodiment, GC can be no greater than 500% GA, such as no greater than 400% GA, no greater than 300% GA, or even no greater than 200% GA.

Referring to FIGS. 1-4 and 9-10, at least one of the projections 120 can cant relative to a central axis 600 of the ring 100. In certain embodiments, GC and GA may be equal prior to canting the projections 120 relative to the central axis 600.

In an embodiment, as shown in FIGS. 9-10, at least one of the projections 120 may have an arcuate profile or arcuate cross-sectional shape. The projections 120 may include at least one generally arcuate edge. In another embodiment, at least one of the projections 120 may have a polygonal profile. The projections 120 may include at least one polygonal angle. For example, the projections 120 may include a triangle or a quadrilateral shape extending from the sidewall 103. In yet another embodiment, at least one of the projections 120 may have an arcuate portion and a polygonal portion.

In an embodiment, as shown in FIG. 9, each projection 120 can define a radially innermost surface 716 and a bridge portion 718 connecting the radially innermost surface 716 to the sidewall 103. In an embodiment, the projection 120 may fill a portion of a bore 750 on a side of the sidewall 103 of the ring 100. A best fit line of the bridge portion 718 can cant relative to the central axis 600. The bridge portion 718 can form an angle 724 with respect to the sidewall 103, as measured in the unassembled or unloaded state. By way of a non-limiting embodiment, the angle 724 between the bridge portion 718 and the sidewall 103 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, the projection 120 may have a radially innermost surface 716 which may have a diameter that is less than the diameter of the sidewall 103. In a number of embodiments, the projection radially innermost surface 716 may have a diameter $D_{IM}$ and the sidewall may have a diameter $D_S$ where $D_{IM} \leq D_S$, such as $D_{IM} \leq 0.95 D_S$, $D_{IM} \leq 0.9 D_S$, $D_{IM} \leq 0.90 D_S$, $D_{IM} \leq 0.85 D_S$, $D_{IM} \leq 0.8 D_S$, $D_{IM} \leq 0.75 D_S$, $D_{IM} \leq 0.7 D_S$, $D_{IM} \leq 0.65 D_S$, $D_{IM} \leq 0.6 D_S$, $D_{IM} \leq 0.55 D_S$, $D_{IM} \leq 0.5 D_S$, $D_{IM} \leq 0.4 D_S$, $D_{IM} \leq 0.2 D_S$, or $D_{IM} \leq 0.1 D_S$.

In another embodiment, in an opposite orientation shown in FIG. 10, each projection 120 can define a radially outermost surface 717 and a bridge portion 718 connecting the radially outermost surface 717 to the sidewall 103. A best fit line of the bridge portion 718 can cant relative to the central axis 600. The bridge portion 718 can form an angle 724 with respect to the sidewall 103, as measured in the unassembled or unloaded state. By way of a non-limiting embodiment, the angle 724 between the bridge portion 718 and the sidewall 103 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, the projection 120 may define a radially outermost surface 717 which may have a diameter that may be greater than the diameter of the sidewall 103. In a number of embodiments, the projection radially outermost surface 717 may have a diameter $D_{OM}$ and the sidewall may have a diameter $D_S$ where $D_S \leq D_{OM}$, such as $D_S \leq 0.95 D_{OM}$, $D_S \leq 0.9 D_{OM}$, $D_S \leq 0.90 D_{OM}$, $D_S \leq 0.85 D_{OM}$, $D_S \leq 0.8 D_{OM}$, $D_S \leq 0.75 D_{OM}$, $D_S \leq 0.7 D_{OM}$, $D_S \leq 0.65 D_{OM}$, $D_S \leq 0.6 D_{OM}$, $D_S \leq 0.55 D_{OM}$, $D_S \leq 0.5 D_{OM}$, $D_S \leq 0.4 D_{OM}$, $D_S \leq 0.2 D_{OM}$, or $D_S \leq 0.1 D_{OM}$.

After installation of the inner component 306 or outer component 302 to contact the ring 100 within the assembly 2, the angle 724 of the bridge portion 718 can decrease or increase with respect to the sidewall 103. The post-installation angle 724 may be dependent on the relative diameter of the inner component 306 or outer component 302 with respect to the ring 100. Therefore, the ring 100 can couple with inner components 306 or outer components 302 having diameters that may be less than the diameter of the sidewall 103 and greater than a best fit circle formed by the innermost surfaces 716 of the projections 120. Further, in the alternative, the ring 100 can couple with inner components 306 or outer components 302 having diameters that may be greater than the diameter of the sidewall 103 and less than the best fit circle formed by the outer surfaces 717 of the projections 120.

In a number of embodiments, the ring 100 may clip, couple, contact, engage, or abut the surface of the inner component 306 through the projection 120. In a number of embodiments, the ring 100 may clip, couple, contact, engage, or abut the surface of the outer component 302 through the projection 120.

As shown best in FIGS. 6A-8D, at least one of the inner or outer component 302, 306 may include at least one groove 311. In a number of embodiments, the inner or outer component 302, 306 may include a plurality of grooves 311. The groove 311 may be located along an exterior circumferential surface of the inner component 306 or the outer component 302. In a number of embodiments, grooves 311 may cover less than 75% of a cross sectional surface bisecting the grooves 311 of the inner component 306 or the outer component 302, such as less than 70% of a cross sectional surface bisecting the grooves 311 of the inner component 306 or the outer component 302, such as less than 60% of a cross sectional surface bisecting the grooves 311 of the inner component 306 or the outer component 302, such as less than 50% of a cross sectional surface bisecting the grooves 311 of the inner component 306 or the outer component 302, such as less than 40% of a cross sectional surface bisecting the grooves 311 of the inner component 306 or the outer component 302. In an embodiment, the inner component 302 may include a groove 311a to accept the projection 120. In an embodiment, the outer component 302, may include a groove 311b to accept the projection 120. In a number of embodiments, an exterior surface 313 of the groove 311a or other exterior surface on the inner component 306 may include at least one of a substrate 119, a low friction/wear resistant layer 104, or any of the layers mentioned above regarding the ring 100 and shown in FIG. 5 including, but not limited to an adhesive layer 121, a corrosion protection layer 704, 705, 708, or a corrosion resistant coating 125 (including an epoxy layer 129 and an adhesion promoter layer 127). In a number of embodiments, an exterior surface 319 of the groove 311b or other exterior surface on the outer component 302 may include at least one of a substrate 119, a low friction/wear resistant layer 104, or any of the layers mentioned above regarding the ring 100 and shown in FIG. 5 including, but not limited to an adhesive layer 121, a corrosion protection layer 704, 705, 708, or a corrosion resistant coating 125 (including an epoxy layer 129 and an adhesion promoter layer 127). In a number of embodiments, the projection 120 may be adapted to compress radially to allow rotational or axial movement between the inner component 306 and the outer component 302 upon application of rotational or axial force respectively to at least one of the inner component 306 or the outer component 302. In a number of embodiments, the projection 120 may be adapted to compress radially to allow rotational and axial movement between the inner component 306 and the outer component 302 upon application of rotational or axial force respectively to at least one of the inner component 306 or the outer component 302. In a number of embodiments, edges of the groove 311 may prevent, impede or restrict radial movement of the ring 100 relative to the inner or outer component 302, 306. The grooves 311 may be machined, cast, coined or otherwise formed in at least one of the inner component 306 or the outer component 302. The grooves 311 may be carefully selected and designed for their force transfer or spring properties. The geometry of the groove 311 may be selected to provide desired elastic/plastic deformation characteristics of the projections 120 accepted within them. For example, at least one groove 311 may be altered in geometry from another groove 311 to alter the rotational or axial movement of the projections 120.

The groove 311 may be formed by a process, such as, for example, stamping, pressing, punching, or cutting. In an embodiment, at least one groove 311 may be formed prior to formation of the inner component 306 or outer component 302. In an embodiment, at least one groove 311 may be formed after formation of the inner component 306 or outer component 302.

In a number of embodiments, as shown in FIGS. 6A-8D, the grooves 311 may have a radial height $H_G$ as measured as the axial space provided in the annular gap 206 between the inner component 306 to the outer component 302 minus the distance taken up by the thickness of the sidewall 103. The grooves 311 may have a radial height $H_G$ of at least 0.5 mm, at least 0.10 mm, at least 0.15 mm, at least 0.20 mm, at least 0.30 mm, at least 0.40 mm. The grooves 311 may have a radial height $H_G$ that may be no greater than 0.5 mm, no greater than 0.10 mm, no greater than 0.15 mm, no greater than 0.20 mm, no greater than 0.30 mm, no greater than 0.40 mm.

In a number of embodiments, as shown in FIGS. 6A-8D, the grooves 311 may have a circumferential length $L_G$ as measured as the circumferential distance between the circumferential edges of the groove 311. The grooves 311 may have a circumferential length $L_G$ of at least 0.5 mm, at least 0.10 mm, at least 0.15 mm, at least 0.20 mm, at least 0.30 mm, at least 0.40 mm. The grooves 311 may have a circumferential length $L_G$ that may be no greater than 0.5 mm, no greater than 0.10 mm, no greater than 0.15 mm, no greater than 0.20 mm, no greater than 0.30 mm, no greater than 0.40 mm.

Each groove 311 can define an aspect ratio as measured by a length $L_G$ thereof as compared to a height $H_G$ thereof. In an embodiment, at least one groove 311 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

Figure 8A:
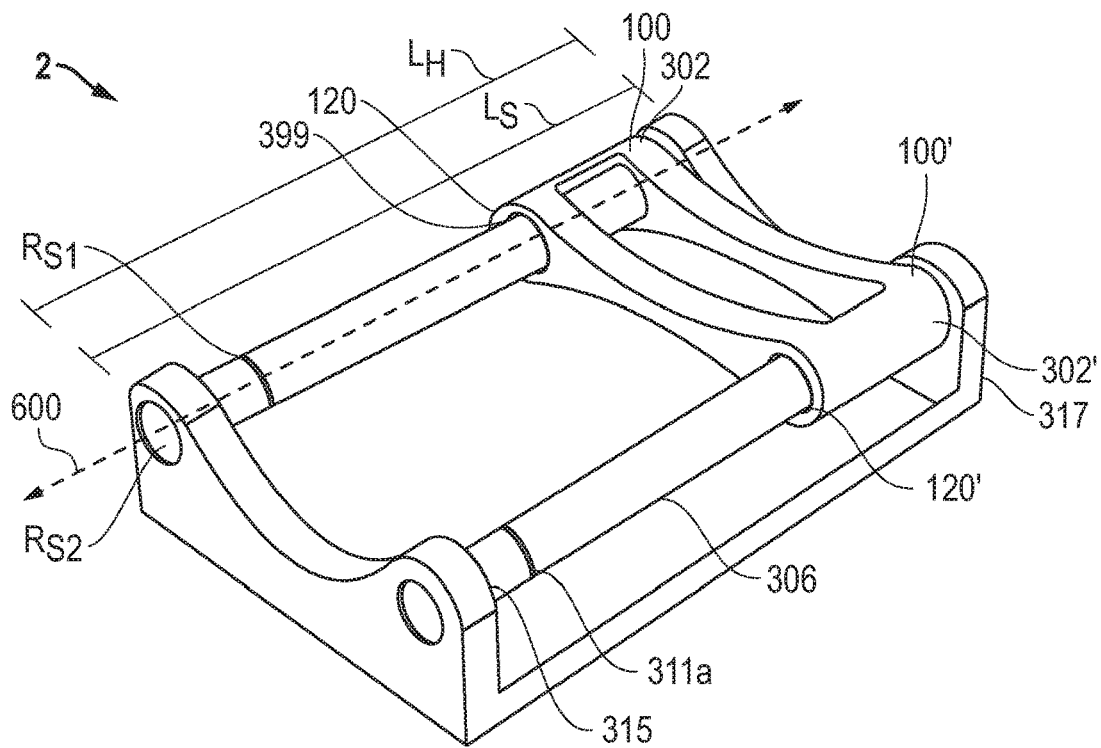
FIG. 8A is a perspective view of an assembly constructed in accordance with the invention.
Figure 8B:
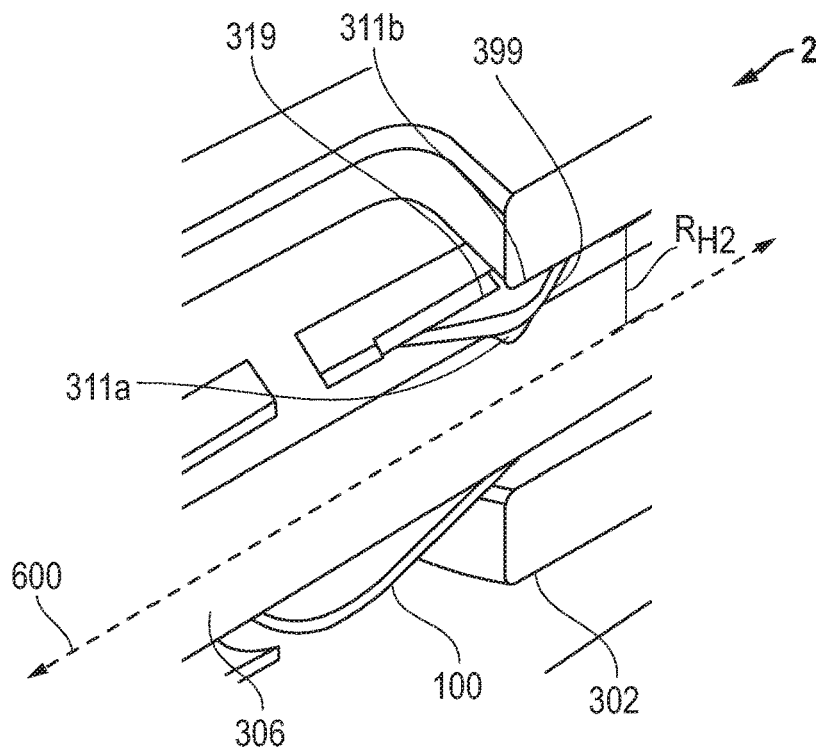
FIG. 8B is a close-up perspective schematic view of an assembly constructed in accordance with the invention.

In a number of embodiments, as shown in FIGS. 4, and 8A-8B, the projection 120 may be adapted to compress radially to allow for axial movement upon application of an axial force to at least one of the inner component 306 or the outer component 302. In a number of embodiments, the projection 120 may extend radially inward and be adapted to clip, couple, contact, engage, abut, compress, expand, or otherwise interact with at least one groove 311a formed on the inner component 306. In a number of embodiments, the projection 120 may extend radially outward and be adapted to clip, couple, contact, engage, abut, compress, expand, or otherwise interact with at least one groove 311b formed on the outer component 302. In an embodiment, the projection 120 may be adapted to compress radially to facilitate axial movement upon application of an axial force, then expand to fill the groove 311a in the inner component 306 to impede axial movement during application of an axial force. In an embodiment, the projection 120 may be adapted to compress radially to facilitate axial movement upon application of an axial force, then expand to fill the groove 311b in the outer component 302 to impede axial movement during application of an axial force. In application, the projections 120 may expand into the groove 311 impeding or holding at least one of the ring 100, inner component 306 or outer component 302 from further axial movement of the ring 100 until a threshold value axial force is exerted, forcing the projection 120 to compress out of the groove 311. In a number of embodiments, as shown in FIGS. 8A-8B, the inner component 306 may be an inner track and the outer component 302 may be an outer track in a sliding assembly 2. In a number of embodiments, the projection 120 may extend circumferentially and is adapted to compress upon application of an axial force within the groove 311 in the outer component 302 or inner component 306. In a number of embodiments, the at least one projection 120 may be contoured such that upon relative axial movement out of the at least one groove 311 in the outer component 302 or inner component 306, the at least one projection is forced to compress radially. In a number of embodiments, the assembly 2 as shown in FIGS. 8A-8D may be used in an automotive assembly for at least one of rotating or axially moving a vehicle component. In a number of variations, as the projection 120 moves in and out of the grooves 311, an audible "clicking" sound may be heard by a user.

In a number of variations, the assembly 2 as shown in FIGS. 8A-8B may be used in whole or as a part of a larger assembly in applications for vehicles including, but not limited to, an armrest assembly, a head restraint assembly, a seat assembly (including a seat cushion extension assembly), a control lever or knob assembly, a sun visor assembly, a cup holder assembly, a rearview mirror assembly, a storage compartment assembly, a HVAC vent assembly, another movable interior panel assembly, a exterior vehicle panel assembly (such as a tailgate or door assembly), a door hinge assembly, a door check assembly, an active aerodynamic assembly, a transmission assembly, or may be used in a different assembly.

In a number of variations, the assembly 2 as shown in FIGS. 8A-8B may differentiate from commonly used sliding or rotational assemblies by providing at least one of low weight and space requirements; good damping of impacts, shocks, and vibrations of the assembly 2; improved hydrodynamics in lubricated, high-speed applications; low costs for adjacent construction of housings 302 or shafts 306; low installation and maintenance efforts; decreasing of parts or complexity of parts; smaller tolerancing requirements; less complex assembly procedures; less complex mechanisms; improved NVH qualities; grease-free operation; or corrosion resistance.

In a number of embodiments, as shown in FIGS. 1-3, 6A-7B, and 8C-8D, the projection 120 may be adapted to compress radially to allow for rotational movement upon application of a rotational force to at least one of the inner component 306 or the outer component 302. In a number of embodiments, the projection 120 may extend radially inward and be adapted to clip, couple, contact, engage, abut, compress, expand, or otherwise interact with at least one groove 311a formed on the inner component 306. In a number of embodiments, the projection 120 may extend radially outward and be adapted to clip, couple, contact, engage, abut, compress, expand, or otherwise interact with at least one groove 311b formed on the outer component 302. In an embodiment, the projection 120 may be adapted to compress radially to facilitate rotational movement upon application of a rotational force, then expand to fill the groove 311a in the inner component 306 to impede rotational movement during application of a rotational force. In an embodiment, the projection 120 may be adapted to compress radially to facilitate rotational movement upon application of a rotational force, then expand to fill the groove 311b in the outer component 302 to impede rotational movement during application of a rotational force. In application, the projections 120 may expand into the groove 311 impeding or holding at least one of the ring 100, inner component 306 or outer component 302 from further rotational movement of the ring 100 until a threshold value rotational force is exerted, forcing the projection 120 to compress out of the groove 311. In a number of embodiments, as shown in FIGS. 6A-7B and 8C-D, the inner component 306 may be a shaft and the outer component 302 may be a housing in a rotational assembly 2. In a number of embodiments, the projection 120 may extend circumferentially and may be adapted to compress upon application of rotational force within the groove 311 in the outer component 302 or inner component 306. In a number of embodiments, the at least one projection 120 may be contoured such that upon relative rotational movement out of the at least one groove 311 in the outer component 302 or inner component 306, the at least one projection is forced to compress radially. In a number of specific embodiments, the assembly 2 as shown in FIGS. 6A-6B, and 8C-8D may be used in an automotive assembly for rotating a vehicle component. In a number of variations, as the projection 120 moves in and out of the grooves 311, an audible "clicking" sound may be heard by a user.

In a number of variations, the assembly 2 as shown in FIGS. 6A-6B, and 8C-8D may be used in whole or as a part of a larger assembly in applications for vehicles including, but not limited to, an armrest assembly, a head restraint assembly, a seat assembly (including a seat cushion extension assembly), a control lever or knob assembly, a sun visor assembly, a cup holder assembly, a rearview mirror assembly, a storage compartment assembly, a HVAC vent assembly, another movable interior panel assembly, a exterior vehicle panel assembly (such as a tailgate or door assembly), a door hinge assembly, a door check assembly, an active aerodynamic assembly, a transmission assembly, or may be used in a different assembly.

In a number of variations, the assembly 2 as shown in FIGS. 6A-6B, and 8C-8D may differentiate from commonly used rotational assemblies by providing at least one of low weight and space requirements; good damping of impacts, shocks, and vibrations of the assembly 2; improved hydrodynamics in lubricated, high-speed applications; low costs for adjacent construction of housings 302 or shafts 306; low installation and maintenance efforts; decreasing of parts or complexity of parts; smaller tolerancing requirements; less complex assembly procedures; less complex mechanisms; improved NVH qualities; grease-free operation; or corrosion resistance.

Figure 8C:
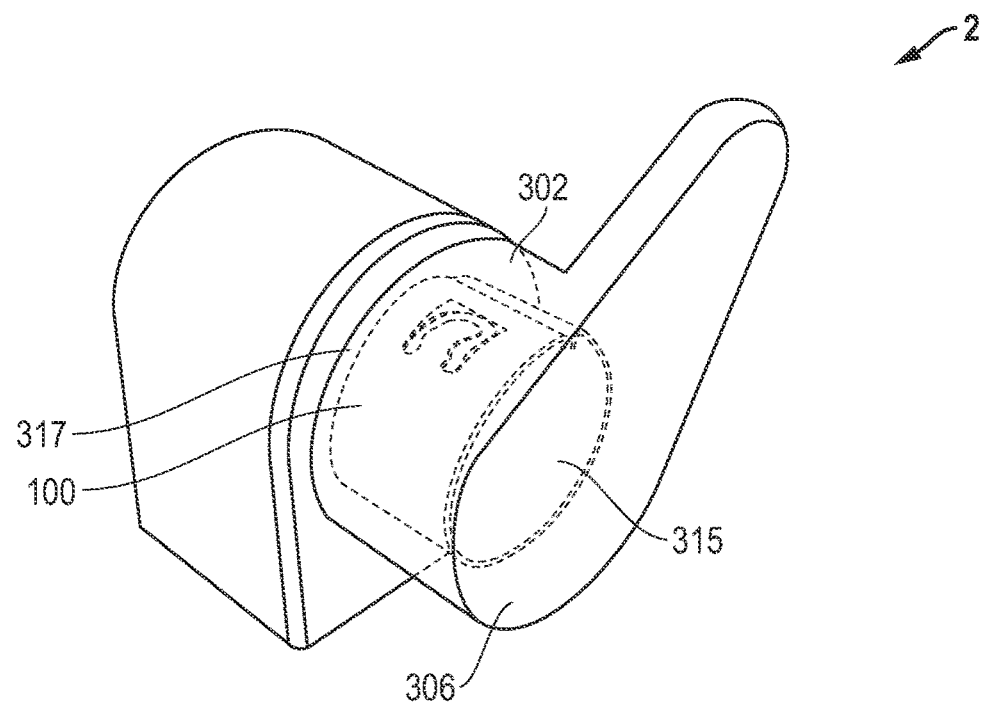
FIG. 8C is a perspective view of an assembly constructed in accordance with the invention.
Figure 8D:
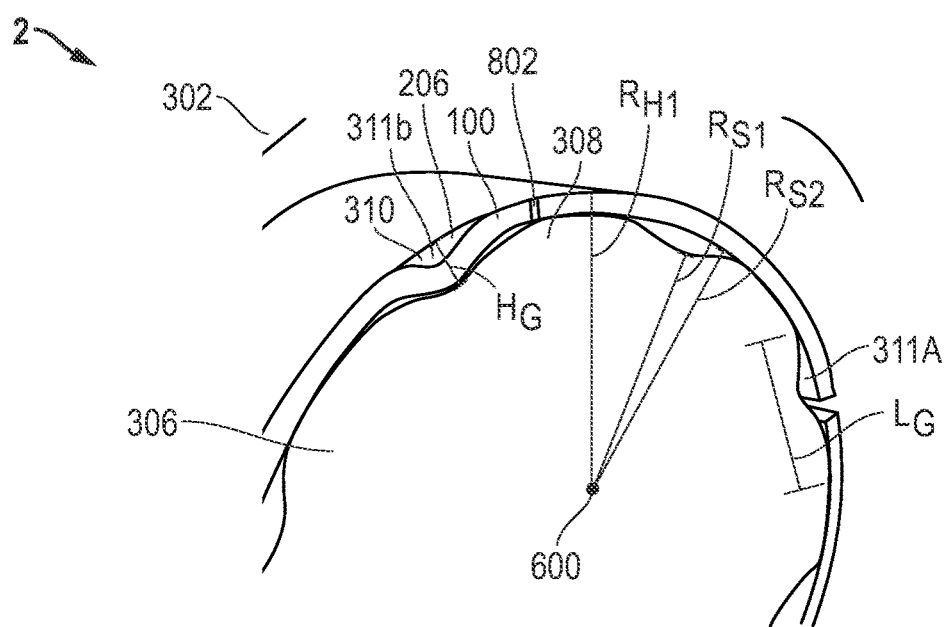
FIG. 8D is a perspective end view of an assembly constructed in accordance with the invention.

In a number of variations, the assembly 2 as shown in FIGS. 8A-8B may combined with the assembly 2 of FIGS. 8C-8D to form an assembly 2 capable of both axial and rotational movement of the outer component 302 relative to the inner component 306 or vice versa. In a number of variations, the assembly 2 as shown in FIGS. 8A-8D may be used in whole or as a part of a larger assembly in applications for vehicles including, but not limited to, an armrest assembly, a head restraint assembly, a seat assembly (including a seat cushion extension assembly), a control lever or knob assembly, a sun visor assembly, a cup holder assembly, a rearview mirror assembly, a storage compartment assembly, a HVAC vent assembly, another movable interior panel assembly, a exterior vehicle panel assembly (such as a tailgate or door assembly), a door hinge assembly, a door check assembly, an active aerodynamic assembly, a transmission assembly, or may be used in a different assembly.

In a number of variations, the assembly 2 as shown in FIGS. 8A-8D may differentiate from commonly used sliding or rotational assemblies by providing at least one of low weight and space requirements; good damping of impacts, shocks, and vibrations of the assembly 2; improved hydrodynamics in lubricated, high-speed applications; low costs for adjacent construction of housings 302 or shafts 306; low installation and maintenance efforts; decreasing of parts or complexity of parts; smaller tolerancing requirements; less complex assembly procedures; less complex mechanisms; improved NVH qualities; grease-free operation; or corrosion resistance.

Figure 7A:
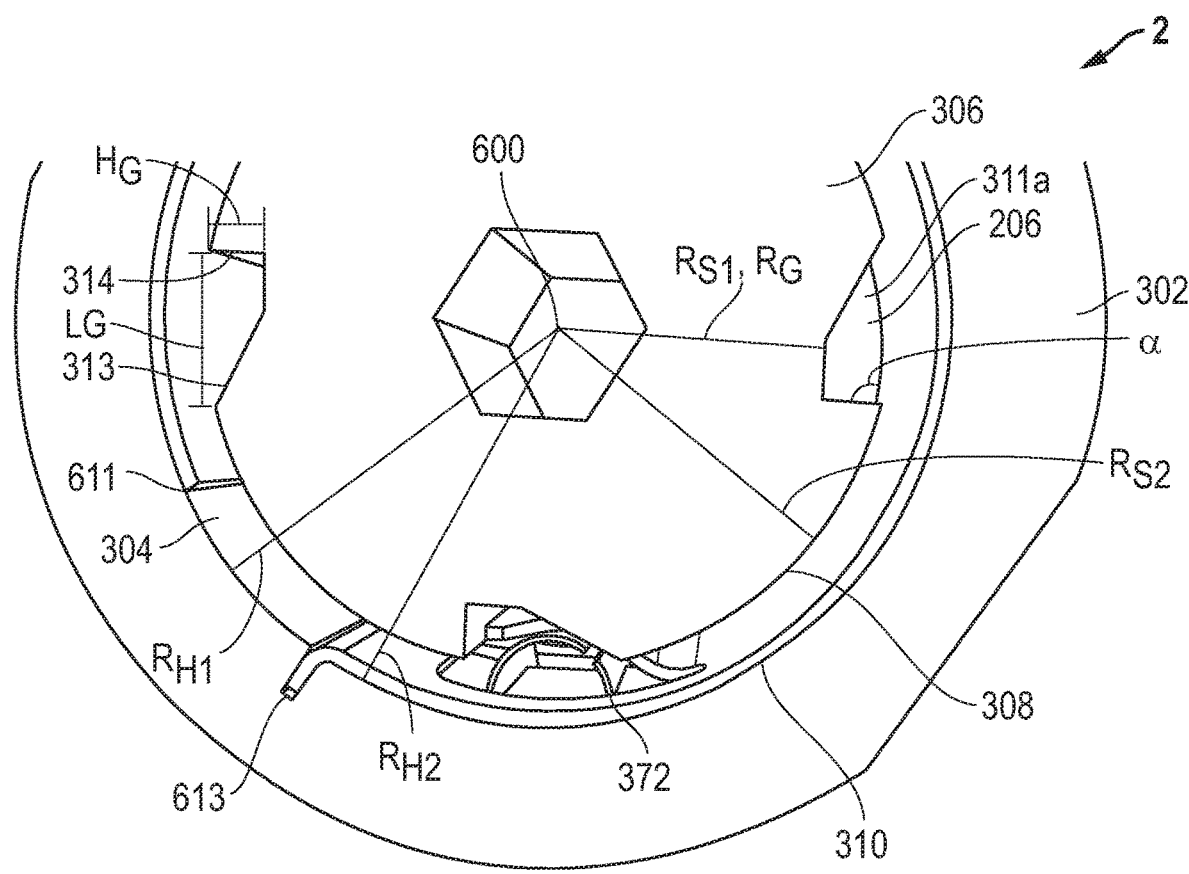
FIG. 7A is an end view of an assembly constructed in accordance with the invention.
Figure 7B:
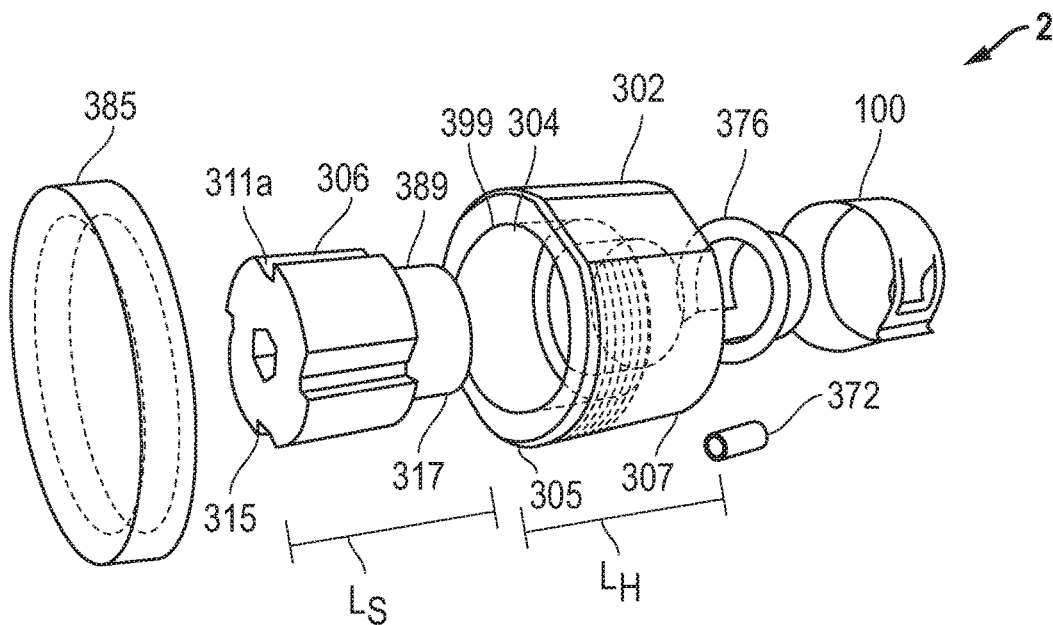
FIG. 7B is a perspective schematic view of an assembly constructed in accordance with the invention.

In a number of more specific embodiments, as shown in FIGS. 2, and 7A-7B, at least one of the projection 120 or the groove in the inner component 311a may be contoured to allow rotation between the inner component 306 and the outer component 302 in a first direction but prevent rotational movement between the inner component 306 and the outer component 302 in a second direction rotationally opposite the first direction. In a number of more specific embodiments, at least one of the projection 120 or the groove in the outer component 311b may be contoured to allow rotation between the inner component 306 and the outer component 302 in a first direction but prevent rotational movement between the inner component 306 and the outer component 302 in a second direction rotationally opposite the first direction. In an embodiment, the first direction may be clockwise and the second direction may be counter-clockwise. In an embodiment, the first direction may be counter-clockwise and the second direction may be clockwise. In an embodiment, the projection 120 may be to compress radially to facilitate rotational movement upon application of a rotational force, then expand to fill the groove 311a in the inner component 306 to impede rotational movement during application of a rotational force. In an embodiment, the projection 120 may be adapted to compress radially to facilitate rotational movement upon application of a rotational force, then expand to fill the groove 311b in the outer component 302 to impede rotational movement during application of a rotational force. As stated above, in a number of embodiments, as shown in FIGS. 2 and 7A-7B, the inner component 306 may be a shaft and the outer component 302 may be a housing in a rotational assembly 2. In a number of specific embodiments, as shown in FIGS. 2 and 7A-7B, the rotational assembly may be a one-way clutch assembly 22. In a number of embodiments, the at least one groove 311a in the inner component 302 may have a profiled surface 313 that allows compression of at least one projection 120 in the first direction. The profiled surface 313 may include a wall 314 that may be adapted to cause interference between the at least one projection 120 and the wall 314 to impede or prevent rotation in the second direction opposite the first direction. In a number of embodiments, the wall 314 may form a wall angle α between the wall 314 and a tangent line intersecting the wall 314 at an outer circumference of the ring 100, wherein the wall angle α may be at least 80°, at least 90°, at least 100°, at least 125° at least 145°. In a number of specific embodiments, the assembly 2 as shown in FIGS. 7A-7B may be used in an automotive assembly for rotating a vehicle component. In a number of variations, as the projection 120 moves in and out of the grooves 311, an audible "clicking" sound may be heard by a user.

In a number of variations, the assembly 2 as shown in FIGS. 7A-7B may be used in whole or as a part of a larger assembly in applications for vehicles including, but not limited to, vehicles including, but not limited to, an armrest assembly, a head restraint assembly, a seat assembly (including a seat cushion extension assembly), a control lever or knob assembly, a sun visor assembly, a cup holder assembly, a rearview mirror assembly, a storage compartment assembly, a HVAC vent assembly, another movable interior panel assembly, a exterior vehicle panel assembly (such as a tailgate or door assembly), a door hinge assembly, a door check assembly, an active aerodynamic assembly, a transmission assembly, or may be used in a different assembly. In a number of variations, the assembly 2 as shown in FIGS. 7A-7B may differentiate from commonly used one-way clutch assemblies by providing at least one of low weight and space requirements; good damping of impacts, shocks, and vibrations of the assembly 2; improved hydrodynamics in lubricated, high-speed applications; low costs for adjacent construction of housings 302 or shafts 306; low installation and maintenance efforts; or corrosion resistance.

In a number of embodiments, as shown in FIGS. 7A-7B, the assembly 2 may further include a collapsible element 372. In an embodiment, the collapsible element 372 may be adapted to contact the projection 120 and an exterior surface 313 (and/or groove 311*a*) in the inner component 306. In an embodiment, the collapsible element 372 may be adapted to contact the projection 120 and an exterior surface 319 (and/or groove 311*b*) in the outer component 302. As shown in FIG. 7A, the collapsible element 372 may be adapted to engage the at least one projection 120 to provide a higher resistance to impede compression of the at least one projection 120. By non-limiting example, as shown in FIG. 7A, the collapsible element 372 may restrict or impede the projection 120 in the ring from collapsing upon rotation of the inner component 306 or outer component 302.

In an embodiment, the collapsible element 372 can include any material commonly used in the rotational, sliding, or clutch assembly arts. The collapsible element 372 can comprise any suitable material with sufficient rigidity to withstand axial and longitudinal forces. In a particular embodiment, the outer component 302 can comprise an injection molded polymer. In another embodiment, the collapsible element 372 can comprise a metal or alloy formed through a machining process. In yet another embodiment, the collapsible element 372 can comprise a ceramic or any other suitable material. The collapsible element 372 can be formed from a single piece, two pieces, or several pieces joined together by welding, adhesive, fasteners, threading, or any other suitable fastening means. In a number of embodiments, the collapsible element 372 may include a spring. In an embodiment, the collapsible element 372 may include spring steel. In a number of variations, the projection 120 on the ring 100 may allow for rotational movement in the first direction and the second direction. This may be accomplished by adjusting the circumferential length $L_P$ or radial height $H_P$ of the projection 120 and/or the dimensions of the collapsible element 372 such that they would allow for rotation in either a first direction or a second direction. This may allow the assembly 2 to be a two-way clutch assembly 22.

As shown in FIG. 7B, the assembly 2 may further include a bushing 376. The bushing 376 may be provided over a narrowed portion 389 of the shaft or inner component 306. The bushing 376 can comprise any suitable material with sufficient rigidity to withstand axial and longitudinal forces. In a particular embodiment, the bushing 376 can comprise an injection molded polymer. In another embodiment, the bushing 376 can comprise a metal or alloy formed through a machining process. In yet another embodiment, the bushing 376 can comprise a ceramic or any other suitable material. The bushing 376 can be formed from a single piece, two pieces, or several pieces joined together by welding, adhesive, fasteners, threading, or any other suitable fastening means.

As shown in FIG. 7B, the assembly 2 may further include at least one end cap 385. The end cap 385 may be provided over the axial end of the inner component 306 or outer component 302. The end cap 385 can comprise any suitable material with sufficient rigidity to withstand axial and longitudinal forces. In a particular embodiment, the end cap 385 can comprise an injection molded polymer. In another embodiment, the end cap 385 can comprise a metal or alloy formed through a machining process. In yet another embodiment, the end cap 385 can comprise a ceramic or any other suitable material. The end cap 385 can be formed from a single piece, two pieces, or several pieces joined together by welding, adhesive, fasteners, threading, or any other suitable fastening means.

Figure 11:
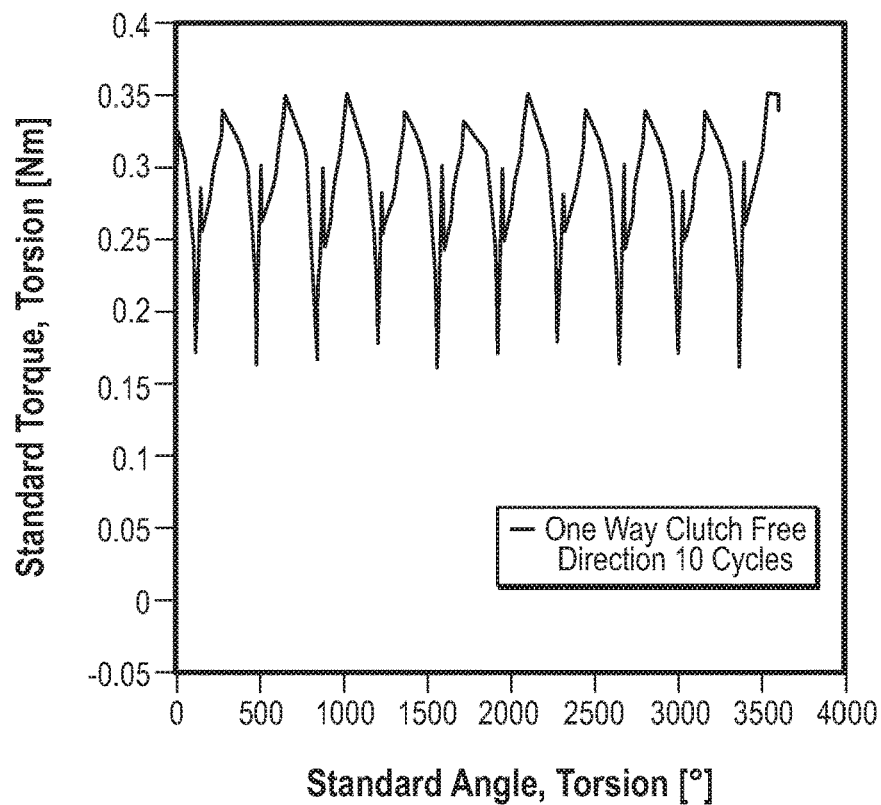
FIG. 11 is a graph of the torque to ratchet around grooves verses standard angle of the projection in one embodiment of a ring constructed in accordance with the invention.
Figure 12:
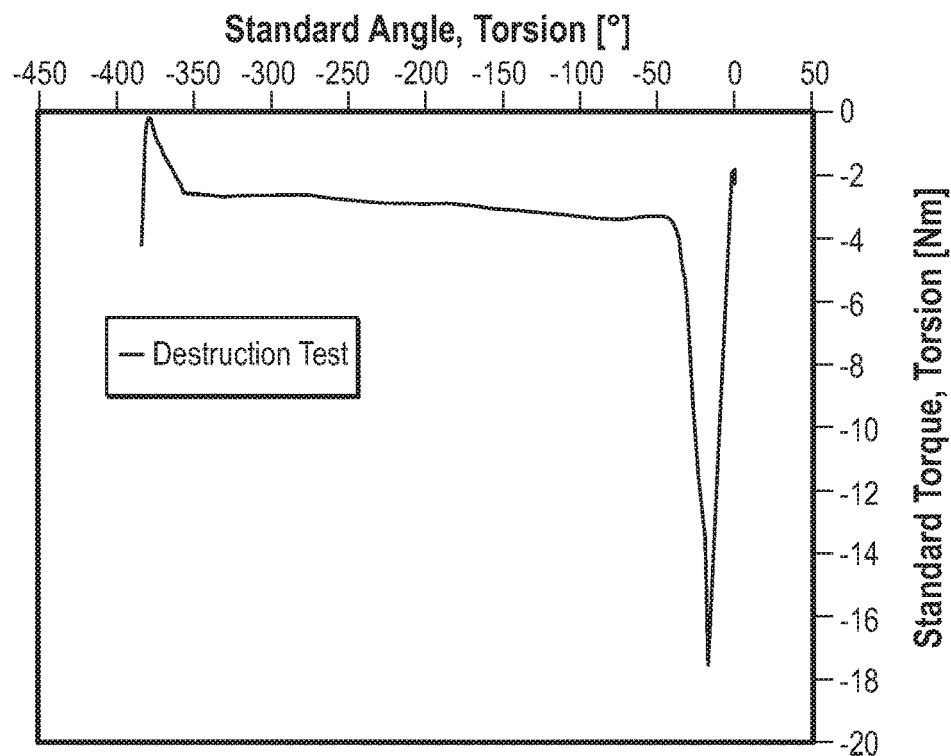
FIG. 12 is a graph of the torque to ratchet around grooves verses standard angle of the projection in one embodiment of a ring constructed in accordance with the invention.

FIGS. 11-12 show the torque of the ring 100 to ratchet around the notches and the force to overcome the ratchet mechanism respectively. FIG. 11 shows the standard angle, torsion degree of the ring 100 versus the standard torque, torsion [Nm] undergoing the destruction test. FIG. 12 shows the standard angle, torsion degree of the ring 100 versus the standard torque, torsion [Nm] of the ring 100 within the assembly 2 after 10 cycles in the first direction. These tests were done with a TL500 torque tester. In the first circumferential direction (clock-wise) the average torque was 0.25 Nm, the lowest torque was 0.18 Nm and the peak torque was 0.34 Nm. In the second circumferential direction (counter-clockwise), the peak T was 17.4 Nm.

Further, the assembly 2 can include other components commonly used and known in the rotational assembly, sliding assembly, or clutch arts.

In an embodiment, the assembly 2 may include a lubricant 399 on any of its components including the inner component 306, outer component 302, or ring 100. The lubricant 399 The lubricant 399 may include a grease including at least one of lithium soap, lithium disulfide, graphite, mineral or vegetable oil, silicone grease, fluorether-based grease, apiezon, food-grade grease, petrochemical grease, or may be a different type. The lubricant 399 may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant 399 may include a solid based lubricant including at least one of lithium soap, graphite, boron nitride, molybdenum disulfide, tungsten disulfide, polytetrafluoroethylene, a metal, a metal alloy, or may be a different type.

In at least one embodiment, the lubricant 399 or low friction/wear resistant layer 104 may provide wear resistant behavior on the ring 100, inner component 306, outer component 302 or another component within the assembly 2. "Wear resistant behavior" may be defined as having a coefficient of friction μ of between about 0.03μ to 0.2μ between a surface of at least one of the components of the assembly 2 (ring 100, inner component 306, outer component 302 or another component within the assembly 2) to another surface of a different component of the assembly (ring 100, inner component 306, outer component 302 or another component within the assembly 2).

In a number of embodiments, as shown in FIGS. 6A-8D, the ring 100 may further include at least one tab 802. In a number of embodiments, the tab 802 may secure, couple, lock, or fix the ring 100 to the inner component 306. The tab 802 may fix the ring 100 to the inner component 306 such that they translate, rotate, or otherwise move in unison in a rotational or axial direction. In a number of embodiments, the tab 802 may secure, couple, lock, or fix the ring 100 to the outer component 302. The tab 802 may fix the ring 100 to the outer component 302 such that they translate, rotate, or otherwise move in unison in a rotational or axial direction. The ring 100 may be prevented from undesired radial movement within the bore 304 by the tab 802. The outer component 302 or inner component 306 may also be prevented from undesired within the bore 304 by the tab 802. In a number of embodiments, the ring 100 may be secured, coupled, locked, or fixed to the inner component 306 or outer component 302 in a different way such as, but not limited to, welding, adhesive, fasteners, threading, or any other suitable coupling means.

In a particular embodiment, as shown in FIGS. 9-10 each projection 120 can further include an end portion 720 extending radially outward from the innermost surface 716. The end portion 720 can extend from the innermost surface 716 opposite the bridge portion 718. In an embodiment, the end portion 720 may extend toward the first axial end 115 of the ring 100. In an embodiment, the end portion 720 may extend toward the second axial end 117 of the ring 100. In an embodiment, the end portion 720 may extend toward the first circumferential end 611 of the ring 100. In an embodiment, the end portion 720 may extend toward the second circumferential end 613 of the ring 100. In an embodiment, a portion of the end portion 720 of the projection 120 can extend radially outward beyond an outer surface 722 of the generally sidewall 103. In another embodiment, an outer surface of the end portion 720 can lie along the same plane as the outer surface 722 of the sidewall 103. In yet a further embodiment, the outer surface of the end portion 720 can terminate radially inside of the outer surface 722 of the sidewall 103. Termination of the end portion 720 radially inside of the outer surface 722 may be particularly suitable when the ring 100 may be encased in an outer component 302 that limits radially outward deflection of the end portion 720 beyond the outer surface 722. In a number of embodiments, the end portion 720 may be planar with a tangent line formed at an outer circumference of the ring. The end portion 720 may be substantially planar with respect to the sidewall 103.

In a number of embodiments, the projection 120 may be a finger projection which contacts an inner surface of the inner component 306 to form an installed state within the assembly 2. In a similar way, the projection 120 may be a finger projection 120 which contacts an outer surface of the inner component 302 to form an installed state within the assembly 2. In an alternative embodiment, the projection 120 may be a finger projection which contacts an inner surface of the outer component 302 to form an installed state within the assembly 2. In a similar way, the projection 120 may be a finger projection which contacts an outer surface of the outer component 302 to form an installed state within the assembly 2. In a number of embodiments, the end portion 720 of the projection 120 may contact the surface of the inner or outer component 302, 306 to prevent or restrict axial or rotational displacement of the inner component 306 relative to the outer component 302, the outer component 302 relative to the inner component 306, or the ring 100 relative to either the outer component 302 or the inner component 306.

In an embodiment, shown in FIGS. 8A-8B, the assembly 2 may include at least two rings 100, 100' within an outer component 302 or a plurality of outer components 302, 302'. The rings 100, 100' may have projections 120, 120'. The outer components 302, 302' may each have a plurality of grooves 311, 311'. In a number of embodiments, the projections 120, 120' may be adapted to seat within at least one groove 311, 311' in the outer component 302, wherein the at least one projection may be adapted to compress radially to allow rotational or axial movement between the inner component 306 and the outer components 302, 302' upon application of rotational or axial force respectively to at least one of the inner component 306 or the outer component 302.

In an embodiment, the assembly 2 may include at least two rings 100, 100' within a inner component 306 or a plurality of inner components 306, 306'. The rings 100, 100' may have projections 120, 120'. The inner components 306, 306' may each have a plurality of grooves 311, 311'. In a number of embodiments, the projections 120, 120' may be adapted to seat within at least one groove 311, 311' in the inner components 306, 306', wherein the at least one projection may be adapted to compress radially to allow rotational or axial movement between the inner component 306 and the outer component 302 upon application of rotational or axial force respectively to at least one of the inner component 306 or the outer component 302.

As stated above, in a number of embodiments, the projection 120 may be installed to couple to the inner component 306 or the outer component 302. In an embodiment, the projection 120 may contact a exterior surface of at least one of the inner component 306 or the outer component 302 to allow rotational or axial movement between the inner component 306 and the outer component 302 upon application of a rotational or axial force with respect to the inner component 306 or the outer component 302, which may be interior and exterior to the ring 100 respectively. In a particular embodiment, a radially innermost surface 716 of at least one projection 120 can contact an exterior surface of at least one of the inner component 306 or the outer component 302. In another embodiment, a radially outermost surface 716 of at least one projection 120 can contact an exterior surface of at least one of the inner component 306 or the outer component 302. More particularly, at least one of the inner component 306 or the outer component 302 can contact the projection 120 causing it to dynamically deflect or compress radially. Moreover, the end portion 720 may slide along the interior surface or the exterior surface of the inner component 306 or the outer component 302 through rotational or axial movement of the ring 100 based on the desired application of the assembly 2.

In a number of embodiments, as stated above, the low friction/wear resistant layer 104 on the ring 100 may provide a slip interface on an inner surface of the ring 100. If the slip interface is provided on the inner surface of the ring 100, relative axial movement of the inner component 306 and bore 304 at that interface is prevented and may instead occur at the outer surface of the ring 100. The outer surface may not have the low friction/wear resistant layer 104 and may therefore provide more resistance to relative motion. In a number of embodiments, the low friction/wear resistant layer 104 on the ring 100 may provide a slip interface on an outer surface of the ring 100. If the slip interface is provided on the outer surface of the ring 100, relative axial movement of the inner component 306 and bore 304 at that interface is prevented and may instead occur at the inner surface of the ring 100. The outer surface may not have the low friction/wear resistant layer 104 and may therefore provide more resistance to relative motion. The ring 100 may be prevented from undesired radial movement within the bore 304. The outer component 302 or inner component 306 may also be prevented from undesired within the bore 304. In some embodiments, at the surfaces of contact between the outer component 302 and the outer surfaces of the band 102, there may be sufficient frictional force to retain the ring 100 in place relative to the outer component 302. In other embodiments, both surfaces of the band 102 may be laminated with a low friction/wear resistant layer 104. Thus, there may be two slip interfaces in such embodiments. In a number of embodiments, the contact area between outer surface 308 and low friction/wear resistant layer 104 may be a slip interface at which relative motion between the inner component 306 and the ring 100 occurs. The ring 100 may be secured relative to the outer component 302 by frictional engagement at the contact area between the band 102 and the inner surface 310.

The ring 100 may be formed with projections 120 that may be designed to achieve spring characteristics as required for the particular force control application intended. The low friction/wear resistant layer 104 may lower the sliding forces, reduces force variation, and provides a low friction slip surface that withstands many slips without wear on the underlying materials. This allows rings 100 to be designed to fulfill force control functions not possible within the usual envelope of performance achieved by variation of ring geometry alone, such as low slip torque, low sliding force, with little force degradation over many slip cycles. For example, a ring 100 in accordance with the invention reduces sliding force or torque to approximately one-half to one-third of what would be expected for an equivalent design, metal-only ring.

In this disclosure, slip torque may be defined as the torque at which two components that may be joined by a ring 100 begin to rotate with respect to each other due to any applied torque loading to the assembly 2. The ring fixing 100 may hold the mating components together without relative rotation until this threshold value may be reached, at which point the frictional forces generated by compression of the ring projections 120 may be overcome and respective rotation or axial movement may occur, resisted by the frictional forces. Similarly, axial sliding force may be the same thing, but in an axial direction. The ring 100 may only permit axial sliding between two components if the threshold force value may be exceeded. The threshold force may be generated by the frictional forces generated by compression of the ring projections 120. Overload protection force, or torque, occurs where the ring 100 slip torque or sliding force may be set to be below the safe capacity of the assembly 2. The ring 100 permits slippage if the assembly 2 receives an external load, above the threshold value, that may otherwise have caused damage to the assembly 2.

Typically, the mating components of the assembly 2 and the ring projections 120 themselves have dimensional variability within given tolerances. Thus, the actual amount of compression of the projections 120, and hence the forces generated in the assembly 2, can vary from assembly 2 to assembly 2. However, if the projections 120 are compressed beyond their 'elastic zone' they behave progressively more plastically, limiting further increase in force from any further compression. This effect may be important where rings 100 provide sliding force control (either axially or rotationally) to minimize force variation due to compression variation, where the projections 120 may be designed to be compressed into their 'plastic zone.'

In some embodiments, the ring 100 provides zero clearance with low slip force for rotational or axial movement. In one aspect, the ring 100 combines a low friction/wear resistant layer 104 to promote slipping with a ring 100 to provide engagement across a gap 206 between two components 302, 306 that move relative to each other. As stated, the low friction/wear resistant layer 104 may be located on an inner surface 103a or an outer surface 103b of the sidewall 103 of the ring 100. The ring 100 structure may be compressible and presents the additional advantages of being operable in a variety of gap 206 sizes (e.g., to compensate for manufacturing embodiments in the dimensions of the components) and present a smaller contact area than conventional rings. In combination with the low friction/wear resistant layer 104, this design provides a significant reduction in frictional forces that oppose relative motion between the components 302, 306 even when the axial or radial load is high.

In use, at least one projection 120 may act as a spring and exerts a radial force against the components 302, 306, thereby providing an interference fit between them. Rotation of the inner or outer component 302, 306 produces similar rotation in the other component as torque may be transmitted by the ring 100. Likewise, linear or axial movement of either component 302, 306 produces similar linear movement in the other component as linear force may be transmitted by the ring 100.

As stated above, the projections 120 may be arranged to project away from the rim 109 to provide a plurality of discrete contact surfaces with one of the inner and outer components 302, 306. The projections 120 may be configured to deform or compress. This may include elastic deformation at the discrete contact surfaces to transmit the load force radially through the ring 100 between the inner and outer components 302, 306. The shape and size of each projection 120 may be selected based on the particular application. The slip force may depend on the shape of the projections 120. In a number of embodiments, the projections 120 may be capable of transmitting relatively high radial forces (e.g., 200 N or more) to locate stably and provide radial stiffness between the inner and outer component 302, 306. In a number of variations, the projections 120 of the ring may provide a radial stiffness between the inner and outer components 302, 306 of no less than about 1,000 N/mm, of such as no less than about 1100 N/mm, such as no less than about 1200 N/mm, no less than about 1300 N/mm, no less than about 1500 N/mm, no less than about 1700 N/mm, no less than about 2000 N/mm, no less than about 2100 N/mm, no less than about 2200 N/mm, no less than about 2300 N/mm, no less than about 2400 N/mm, no less than about 2500 N/mm, no less than about 3000 N/mm, no less than about 3500 N/mm, or even no less than about 4000 N/mm. In yet other embodiments, the projections 120 of the ring may provide a radial stiffness between the inner and outer components 302, 306 of no greater than about 7500 N/mm, such as no greater than about 7000 N/mm, no greater than about 6500 N/mm, no greater than about 6000 N/mm, no greater than about 5500 N/mm, or even no greater than about 5000 N/mm. Each projection 120 comprises a footprint region where its edges meet the band 102. The slip interface may be at the load transfer point between a footprint region and one of the inner and outer components 302, 306. For example, this may occur between the ring 100 and the one of the inner and outer components 302, 306 that contacts the rims 109. The area of the footprint region may be relatively small, which, in combination with the low friction/wear resistant layer 104, reduces the frictional forces.

In a number of embodiments, the ring 100 may provide a sliding force while the projections 120 are outside the grooves 311 (i.e. compress) of no greater than about 29 N, no greater than about 28 N, no greater than about 27 N, no greater than about 26 N, no greater than about 25 N, no greater than about 24 N, no greater than about 23 N, no greater than about 22 N, no greater than about 21 N, no greater than about 20 N, no greater than about 19 N, no greater than about 18 N, no greater than about 17 N, no greater than about 16 N, no greater than about 15 N, no greater than about 14 N, or no greater than about 13 N. In a number of embodiments, the ring 100 may provide a sliding force for the projections 120 to rotate out of or axially slide out of are inside the grooves 311 (i.e. expand) of no less than about 100 N, of no less than about 150 N, of no less than about 200 N, of no less than about 250 N, of no less than about 300 N, of no less than about 350 N, of no less than about 400 N, of no less than about 450 N, or of no less than about 500 N. In this way, the ratio $\theta$ of sliding force of the ring 100 positioned such that the projection 120 is outside the groove 311 (i.e. compress) to the ring 100 positioned such that the projection 120 is inside the groove 311 (i.e. expand) is less than about 0.75 and greater than about 0.005, such as less than about 0.5 and greater than about 0.01, such as less than about 0.4 and greater than about 0.05, such as less than about 0.3 and greater than about 0.1, or such as less than about 0.25 and greater than about 0.2. The sliding force may be axial or rotational based on the desired movement of the assembly 2 as described above. The sliding forces provided on the ring 100 may also apply to the forces necessary to move one of the inner component 306 or outer component 302 relative to the other depending upon which component 302, 306 is coupled to the ring 100 via the tab 802 or through another way.

According to still another aspect, there may be provided a method including providing an inner component 306 and an outer component 302. The method may further include providing a ring 100 between the inner component 306 and the outer component 302. The ring 100 may include a sidewall 103, and at least one projection 120 from the sidewall 103 that projects radially to seat within at least one groove 311 in the inner component 306 or outer component 302. The method may further include applying a rotational or axial force to at least one of the inner component 306 or outer component 302 such that the at least one projection 120 compresses radially to allow rotational or axial movement between the inner component 302 and the outer component 306 upon application of the rotational or axial force to at least one of the inner component 306 or the outer component 302. The method may further include contacting the projection 120 to at least one of the inner component 306 or the outer component 302 to retain the ring 100 to at least one of the inner component 306 or the outer component 302. The method may further include providing a second ring 100' and positioning the second ring 100' between the inner component 306 and the outer component 302 where the first ring 100 projection 120 retains the first ring 100 to the inner component 306 and the second ring 100' comprising a projection 120' that retains the second ring 100' to the outer component 302. The method may further include providing a tab 802 on the ring 100 to couple, lock, or fix the ring 100 to the inner component 306 or outer component 302.

In an embodiment, the assembly 2 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the torque assembly 2 can be installed or assembled by an assembly force of no greater than 20 kg in a longitudinal direction to the housing 8, such as no greater than 19 kgf, no greater than 18 kgf, no greater than 17 kgf, or even no greater than 16 kgf. In a number of embodiments, the projection 120 of the ring 100 may have a snap-in function that can reduce assembly force by a factor of 5 to 10.

In a number of embodiments, the fit of the ring 100 relative to at least one of the inner component 306 or outer component 302 may reduce assembly time by eliminating the heat needed during installation when heat shrink press fitting. The assembly 2 may be noise free or substantially free of rattling as a result of the projections 120 acting to prevent axial displacement of the ring 100 relative to the inner component 306 or the outer component 302, or the inner component 302 and the outer component 306 relative to each other. Additional machining or additional component parts within the assembly 2 may also be eliminated through use of the ring 100. This may increase the lifetime of the assembly 2 and its components. Further, thinner walls of at least one of the ring 100, inner component 306 or outer component 302 in the assembly 2 may allow for lighter assembly forces and easier installation.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: an assembly comprising: an outer component; an inner component; and a ring positioned between the outer component and the inner component, the ring comprising at least one radially extending projection adapted to seat within at least one groove in the inner component or outer component, wherein the at least one projection is adapted to compress radially to allow rotational or axial movement between the inner component and the outer component upon application of rotational or axial force respectively to at least one of the inner component or the outer component.

Embodiment 2: The assembly of embodiment 1, wherein the assembly is a sliding assembly, wherein the inner component comprises an inner track, the outer component comprises an outer track, and the projection compresses radially to allow axial movement between the inner track and the outer track upon application of an axial force to at least one of the inner track or the outer track.

Embodiment 3: The assembly of embodiment 1, wherein the assembly is a rotational assembly, wherein the inner component comprises a shaft, the outer component comprises a housing, and the projection compresses radially to allow rotational movement between shaft and the housing upon application of a rotational force to at least one of the shaft or the housing.

Embodiment 4: The assembly of embodiment 3, wherein the at least one groove and at least one projection are contoured such as to allow rotation between the shaft and the housing in a first direction but prevent rotational movement between the shaft and the housing in a second direction rotationally opposite to the first direction.

Embodiment 5: The assembly of embodiment 4, wherein the at least one groove has a profiled surface that allows compression of the at least one projection in the first rotational direction, and a wall adapted to cause interference between the at least one projection and the wall to prevent rotation in the second direction.

Embodiment 6: The assembly of embodiment 5, wherein the wall has a wall angle between the wall and a tangent line intersecting the wall at an outer circumference of the ring, wherein the wall angle is at least 80°, at least 90°, at least 100°, at least 125° at least 145°.

Embodiment 7: The assembly of any of the preceding embodiments, wherein the at least one projection extends circumferentially and is adapted to compress upon application of a rotational force.

Embodiment 8: The assembly of any of the preceding embodiments, wherein the at least one projection extends axially and is adapted to compress upon application of an axial force.

Embodiment 9: The assembly of any of the preceding embodiments, wherein the at least one projection extends radially inward and is adapted to interact with at least one groove formed on the inner component.

Embodiment 10: The assembly of any of the preceding embodiments, wherein the at least one projection extends radially outward and is adapted to interact with at least one groove formed on the outer component.

Embodiment 11: The assembly of any of the preceding embodiments, wherein an exterior surface on at least one of the at least one projection or groove further comprises a low friction/wear resistant layer.

Embodiment 12: The assembly of embodiment 11, wherein the low friction/wear resistant layer comprises a fluoropolymer.

Embodiment 13: The assembly of any of the preceding embodiments, wherein the at least one projection is contoured such that upon relative rotational movement out of the at least one groove, the at least one projection is forced to compress radially.

Embodiment 14: The assembly of any of the preceding embodiments, wherein the at least one projection is contoured such that upon relative axial movement out of the at least one groove, the at least one projection is forced to compress radially.

Embodiment 15: The assembly of embodiment 4, wherein the rotational assembly further comprises a collapsible element adapted to engage the at least one projection to provide a higher resistance to impede the compression of the at least one projection.

Embodiment 16: The assembly of any of the preceding embodiments, wherein the ring is a split ring design comprising first and second circumferential ends separated by a gap.

Embodiment 17: The assembly of any of the preceding embodiments, further comprising a lubricant between at least one of the inner component, the outer component, and the ring.

Embodiment 18: The assembly of any of the preceding embodiments, wherein the at least one projection has an arcuate cross-sectional shape.

Embodiment 19: The assembly of any of the preceding embodiments, wherein the at least one projection has an end portion planar with a tangent line formed at an outer circumference of the ring.

Embodiment 20: The assembly of any of the preceding embodiments, wherein the ring is secured to one of the inner component or outer component so as to translate or rotate with the inner component or outer component Embodiment 21: The assembly of any of the preceding embodiments, wherein a coefficient of friction µ of between about 0.03µ to 0.2µ exists between contacting surfaces of the projections and grooves in at least one of the inner component or outer component.

Embodiment 22: The assembly of any of the preceding embodiments, wherein the friction layer or lubricant provides wear resistant behavior of the exterior surface on at least one of the at least one projection or groove.

Embodiment 23: The assembly of any of the preceding embodiments, wherein a ratio of sliding force θ of the ring positioned such that the projection is outside the groove to the ring positioned such that the projection is inside the groove is less than about 0.75 and greater than about 0.005.

Embodiment 24: The assembly of any of the preceding embodiments, wherein the groove covers less than 75% of a cross-sectional surface bisecting the groove.

Embodiment 25: The assembly of embodiment 20, wherein the ring further comprises a tab adapted to secure the ring to one of the inner component or outer component.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. For example, embodiments may relate to rotational devices such as an electric motor, such as a windshield wiper motor), or axial sliding applications, such as a steering column adjustment mechanism.

While embodiments have been shown or described in only some of forms, it should be apparent to those skilled in the art that they are not so limited, but are susceptible to various changes without departing from the scope of the invention.

The invention claimed is:

1. An assembly comprising:
an outer component;
an inner component; and
a ring positioned between the outer component and the inner component, the ring
comprising a sidewall comprising at least one radially extending projection adapted to seat within at least one groove in the inner component or outer component, wherein the at least one projection is adapted to compress radially to allow rotational movement between the inner component and the outer component upon application of rotational force respectively to at least one of the inner component or the outer component, wherein the projection is coupled to the sidewall along a first side thereof and continuously disconnected from the sidewall along the remaining sides.

2. The assembly of claim 1, wherein the assembly is a rotational assembly, wherein the inner component comprises a shaft, the outer component comprises a housing, and the projection compresses radially to allow rotational movement between shaft and the housing upon application of a rotational force to at least one of the shaft or the housing.

3. The assembly of claim 1, wherein the at least one projection extends circumferentially and is adapted to compress upon application of a rotational force.

4. The assembly of claim 1, wherein the at least one projection extends radially outward and is adapted to interact with at least one groove formed on the outer component.

5. The assembly of claim 1, wherein an exterior surface on at least one of the at least one projection or groove further comprises a low friction/wear resistant layer.

6. The assembly of claim 1, wherein the ring is a split ring design comprising first and second circumferential ends separated by a gap.

7. The assembly of claim 1, further comprising a lubricant between at least one of the inner component, the outer component, and the ring.

8. The assembly of claim 1, wherein the at least one projection has an arcuate cross-sectional shape.

9. The assembly of claim 1, wherein the ring is secured to one of the inner component or outer component so as to translate or rotate with the inner component or outer component.

10. The assembly of claim 9, wherein the ring further comprises a tab adapted to secure the ring to one of the inner component or outer component.

11. The assembly of claim 1, wherein a coefficient of friction μ of between about 0.03μ to 0.2μ exists between contacting surfaces of the projection and groove in at least one of the inner component or outer component.

12. The assembly of claim 1, wherein a ratio of sliding force θ of the ring positioned such that the projection is outside the groove to the ring positioned such that the projection is inside the groove is less than about 0.75, and greater than about 0.005.

13. The assembly of claim 1, wherein the at least one projection comprises a plurality of projections and wherein at least two of the projections have the same geometric shape or size as compared to each other.

14. The assembly of claim 1, wherein the at least one projection comprises a plurality of projections and wherein all of the projections have the same geometric shape or size as compared to each other.

15. The assembly of claim 1, wherein the at least one projection comprises a plurality of projections and wherein at least two of the projections have different geometric shape or size as compared to each other.

16. The assembly of claim 1, wherein the at least one projection comprises a plurality of projections and wherein all of the projections have different geometric shape or size as compared to each other.

17. The assembly of claim 1, wherein the at least one projection comprises a bridge portion.

18. The assembly of claim 1, wherein the at least one projection can cant relative to a central axis.

19. The assembly of claim 1, wherein the at least one projection is oriented circumferentially down the sidewall of the ring.

20. The assembly of claim 1, wherein the at least one projection includes an end portion extending toward a first circumferential end of the ring.

* * * * *